(12) United States Patent  (10) Patent No.: US 9,056,644 B2
Hudák  (45) Date of Patent: Jun. 16, 2015

(54) BICYCLE, MODIFIABLE FOR UPHILL, DOWNHILL AND/OR TRAIL CONDITIONS

(76) Inventor: Boris Hudák, Prievidza (SK)

(*) Notice: Subject to any disclaimer, the term of this patent is extended or adjusted under 35 U.S.C. 154(b) by 0 days.

(21) Appl. No.: 14/240,125

(22) PCT Filed: Aug. 20, 2012

(86) PCT No.: PCT/SK2012/050012
§ 371 (c)(1),
(2), (4) Date: Feb. 21, 2014

(87) PCT Pub. No.: WO2013/028138
PCT Pub. Date: Feb. 28, 2013

(65) Prior Publication Data
US 2014/0210180 A1  Jul. 31, 2014

(30) Foreign Application Priority Data
Aug. 22, 2011 (SK) .............................. 50081-2011 U

(51) Int. Cl.
| B62K 13/08 | (2006.01) |
| B62K 3/02 | (2006.01) |
| B62K 15/00 | (2006.01) |
| B62K 25/04 | (2006.01) |
| B62K 25/28 | (2006.01) |
| B62K 19/30 | (2006.01) |
| B62K 19/34 | (2006.01) |
| B62K 19/36 | (2006.01) |
| B62K 21/22 | (2006.01) |

(Continued)

(52) U.S. Cl.
CPC . *B62K 3/02* (2013.01); *B62K 15/00* (2013.01); *B62K 25/04* (2013.01); *B62K 25/28* (2013.01); *B62K 25/286* (2013.01); *B62K 19/30* (2013.01); *B62K 19/34* (2013.01); *B62K 19/36* (2013.01); *B62K 21/22* (2013.01); *B62K 2025/048* (2013.01); *B62K 2025/047* (2013.01); *B62K 25/20* (2013.01); *B62K 13/08* (2013.01); *B62K 19/28* (2013.01)

(58) Field of Classification Search
CPC ......... B62K 13/08; B62K 13/00; B62K 15/00
See application file for complete search history.

(56) References Cited

U.S. PATENT DOCUMENTS

| 392,523 A | 12/1888 | Owen |
| 423,471 A | 3/1890 | Easthope |

(Continued)

FOREIGN PATENT DOCUMENTS

| DE | 164930 C | 9/1904 |
| DE | 4101745 A1 | 7/1992 |

(Continued)

*Primary Examiner* — Kevin Hurley
(74) *Attorney, Agent, or Firm* — James Creighton Wray

(57) ABSTRACT

A bicycle comprising a Frame (1), a Front Wheel (9), a Rear Wheel (10), a Drivetrain Assembly (11), a Pedal Assembly (6), a Seat Assembly (5), Handlebar Assembly (7), a hard Tail (2) or a movable Tail (2) which is supported by a Suspension Assembly (4) and a hard Fork (3) or a telescopic Fork (3), the mutually slidable parts of which are interconnected by a Suspension Assembly (4). Further, a center of the Front Wheel (9), a center of the Rear Wheel (10), a Bottom Bracket (6.1) center, a Seat (5.1) connection and a Handlebar (7.1) connection form the vertices of a pentagon, the shape of which is slope-modifiable by at least one positionally adjustable vertex, when Suspension Assemblies (4) are unloaded.

10 Claims, 27 Drawing Sheets

(51) Int. Cl.
*B62K 25/20* (2006.01)
*B62K 19/28* (2006.01)

(56) References Cited

U.S. PATENT DOCUMENTS

| 450,705 | A | 4/1891 | Sunbridge |
| 465,599 | A | 12/1891 | McGlinchey |
| 519,855 | A | 5/1894 | Whitaker |
| 944,795 | A | 12/1909 | Leet |
| 5,356,165 | A | 10/1994 | Kulhawik |
| 5,857,691 | A | 1/1999 | Fan |
| 6,702,312 | B1 * | 3/2004 | Miksik ......................... 280/287 |
| 8,128,113 | B2 * | 3/2012 | Fioravanti et al. ......... 280/281.1 |
| 2001/0030408 | A1 | 10/2001 | Miyoshi |
| 2002/0084620 | A1 * | 7/2002 | Yu et al. ....................... 280/283 |
| 2004/0032110 | A1 * | 2/2004 | Bigot ............................ 280/287 |
| 2004/0070169 | A1 | 4/2004 | Lesage |
| 2010/0301582 | A1 * | 12/2010 | Tsai .............................. 280/278 |

FOREIGN PATENT DOCUMENTS

| DE | 9211320 | U1 | 11/1992 | |
| DE | 9302496 | U1 | 9/1993 | |
| DE | 4436211 | A1 * | 4/1996 | ............ B26K 17/00 |
| EP | 1234760 | A2 | 2/2002 | |
| FR | 798005 | A | 5/1936 | |
| FR | 2867444 | A1 | 9/2005 | |
| GB | 189720022 | A | 11/1897 | |

* cited by examiner

BICYCLE, MODIFIABLE FOR UPHILL, DOWNHILL AND/OR TRAIL CONDITIONS

This application claims the benefit of Slovakia Application No. PUV 50081-2011 filed Aug. 22, 2011, and PCT/SK2012/050012 filed Aug. 20, 2012, International Publication No. WO 2013/028138, and the amended claim sheets under Article 19, which are hereby incorporated by reference in their entirety as if fully set forth herein.

FIELD OF THE INVENTION

The present invention relates to bicycles for riding in variably sloped and/or variably rough trail conditions.

STATE OF THE ART

The state of the art bicycles within the technical field comprises assemblies co-creating functional Systems as follows: A Motion System (having assemblies: a Front Wheel, Rear Wheel, Drivetrain Assembly), a Rider-Positioning System (having: a Handlebar Assembly, Seat Assembly, Pedal Assembly) and a Frame System (having: a Fork, Frame, Tail) that are the same as state of the art Systems of street and road-bicycles with only differences in dimensions, shape and rigidity of its assemblies.

These bicycles could possibly be sprung suspended, what means that a Tail of such bicycle is movably attached to a Frame and/or its telescopic Fork consists of mutually sliding parts and the bike has a shock absorbing Suspension System (comprising one or more Suspension Assemblies), which interconnects the movable Tail with the Frame and/or the upper part of the telescopic Fork with its bottom part. Said Suspension System can be supplemented with a Regulating System (based on Regulating Units, which are components of regulated Suspension Assemblies, e.g. U.S. Pat. Nos. 7,708, 296, 7,722,069) for its locking or regulating.

The non-sprung (rigid, hard) Frame System is more advantageous for smoother surfaces and steeper climbings due to its lower weight and higher rigidity, resulting in higher pedaling efficiency The advantage of said sprung Frame System is in comfort, provided by shock absorption and in improved contact of wheels with ground while riding downhill or on rough trail conditions, especially in the curves. The disadvantage of the sprung Frame is in its lower rigidity.

Regulating System enables changing rigidity of Frame System in longitudinal central plane, by means of locking Suspension System or changing its softness. This combines the advantages of sprung and non-sprung bicycles. However, the locking of suspension, on smooth roads and uphill climbing, remains lateral rigidity of bicycle non-enhanced, although typically, higher rigidity is most desired in such conditions. Manual control of Regulating System, particularly when control unit is not situated on Handlebar, is challenging, This is especially unfavourable while riding in frequently changing trail conditions, when driving situations are demanding and when frequent softness regulation is the most desirable.

Current Regulating Systems don't provide potentially useful features like automatic switching-on of a Suspension System in response to over-limit loading, locking of Frame System in selected elevation travel position or adjusting geometry so that full squeezing of Suspension Units respects maximal elevation, predetermined according to needs.

Disadvantage of common Rider-Positioning Systems is in fixed position of its Seat (except Seat Post height arrangement), Bottom Bracket and Handlebar with respect to Frame System (its Frame or Fork). This gives only limited options for adapting rider's centre of gravity over wheelbase to eliminate forward rollover risk while riding downhill or to prevent Front Wheel lifting while riding uphill. Another disadvantage is inability to rise up a Bottom Bracket while riding over uneven ground or downhill trail or jumping. Such rising would diminish the risk of pedal crank impact on ground undulations.

There are known solutions enabling adaptation of Rider-Positioning System for instance adjusting Seat Assembly (U.S. Pat. Nos. 7,775,588, 7,703,846, 5,149,034; US 20070018424, 20100327641), Pedal Assembly (U.S. Pat. No. 7,854,440), coupled Seat and Pedal Assembly (EP1551693), Handlebar Assembly (U.S. Pat. Nos. 5,357,826, 7,699,332, US 20060202442), or changing geometry by piston (U.S. Pat. No. 7,182,358). However, the benefits of these solutions are generally smaller than their disadvantages in poorer rigidity, weight aerodynamics, and performance, especially if these assemblies are not adjustable while riding or if standard Drive train Assembly cannot be used with them. It is indicated by their low occurrence in the market.

Common Drivetrain Assembly comprising a single chain (or drive shaft) allows only limited changes of the distance between Pedal Assembly and sprung suspended Rear Wheel. Its Bottom Bracket is usually firmly attached to a Frame, which best suits to withstand lateral stress from pedal cranks, because its rigidity.

A rear sprung suspended Frame System requires such geometry of a Tail and its joints which ensures that any changes of distance between Bottom Bracket (on Frame) and Rear Wheel (on movable Tail) does not exceed the range, tolerable by Drive train Assembly. It also has to prevent motion of a Tail, due to chain pull, in order to eliminate losses in pedalling efficiency.

Said movable Tail is usually embodied as a swing arm attached to a Frame at line of chain pull axis, or as an articulated four or more bar assembly (U.S. Pat. Nos. 7,566,066, 7,891,688, 7,658,394, 7,703,788; US 20100327556, 20100102531, 2009026.1556). The first solution is advantageous for its simplicity and the second one for higher efficiency of propulsion and shock absorbing. Efficiency of rear suspension depends on the rate of coincidence of direction of its elevation with direction of impacts from ground undulations, on the adequacy of length of spring elevation and spring softness to wheel impacts and no responsiveness to other forces, apart from wheel impacts.

Further enhancing of suspended bicycles effectiveness is possible by attaching a Tail with sliding pins to a Frame, or by attaching Pedal Assembly to a Frame in movable manner. Known embodiment (U.S. Pat. No. 7,722,072) with sliding pins has one of its travel paths oriented towards a Rear Wheel and the second one across (in line connecting a Bottom Bracket with a Seat) and has its Pedal Assembly firmly attached to its Frame. Therefore this solution cannot fully eliminate forward component of movement and cannot enable backwardly inclined elevation path at all. Known embodiment (U.S. Pat. No. 6,099,010) with a movably attached Pedal Assembly, has a movable Hanger Unit attached to the front end of a movable Tail and a Distancing Unit to a Frame. This solution along with favourable geometry provides fixed distance of a Pedal Assembly from a Seat during a Tail travel and thus enhancing effectiveness of pedalling. There are not known embodiments that combine sliding pins of a Tail with a movable Pedal Assembly. This should ensure a constant distance between a Bottom Bracket and a Rear Wheel, and a backwardly sloped path of a Rear Wheel travel, during shock absorbing process.

SUMMARY OF THE INVENTION

The presented invention, which eliminates the mentioned disadvantages, relates to a bicycle comprising assemblies, which co-create a shape-modifiable Rider-Positioning System and/or a state of art Suspension System which is supplemented with a Regulating System. The assemblies of mentioned Systems could be in some cases attached to assemblies co-creating a Transforming System.

Said shape-modifiable Rider-Positioning System has a movable Pedal Assembly and/or a movable Seat Assembly and/or a movable Handlebar Assembly.

The said movable Pedal Assembly has a Bottom Bracket firmly attached to a movable Tail or movably attached to a bicycle by two pivotable connections. One of the connections is attached to the rear end of a Tail (directly, or indirectly through a Rear Axis) and is mediated by a Distancing Unit, the second one is attached to a Frame (directly and/or indirectly through a Seat Assembly or to the front end of a Tail) and is mediated by a Hanger unit. Said movable Seat Assembly is movably connected to a Frame and is lockable by at least one Seat Lock. Said movable Handlebar Assembly has its Handlebar attached movably toward a Fork by a carrier. The Handlebar position is lockable by at least one Handbar Lock or a Carrier Lock.

A sprung Suspension System has a state of art front and/or a rear Suspension Assembly and these assemblies are supplemented with a Regulating System and in some cases also with Self-Controlling Assembly of Transforming System.

Regulating System has an independent Regulating Assembly, which supplements the Suspension Assembly and/or a state of art Regulating Unit of regulate-able Suspension Assembly new only by its attachment to the Self-Controlling Assembly.

Rear Suspension Assembly supplemented with a Regulating Assembly and/or a Self-Controlling Assembly interconnects a movable Tail with a Frame. A Front Suspension Assembly supplemented with a Regulating Assembly and/or a Self-Controlling Assembly interconnects mutually slidable parts of a telescopic Fork.

Alternatively, a Frame System should be designed as a shape-modifiable structure, in order to provide shape-modifiability of a Rider-Positioning System. In this case the Frame part containing a Head Tube is move-ably attached to the rest of the Frame and/or a Tail has shape-modifiable geometry and/or a Suspension System is move-ably attached either to a Frame or to a Tail. The movable parts of the shape-modifiable Frame System and the shape-modifiable Rider-Positioning System are attached to the Shifting Assembly and/or to the Synchronization Assembly of a Transforming System.

The advantages of said bicycle are in both maintaining constant distance of a Bottom Bracket from a Rear Wheel while absorbing shocks and in capability to adjust a Rider-Positioning System and a Regulating System to conform softness of shock absorption, rider's body position and weight allocation with actual speed and with unevenness and steepness of ground.

The following versions of said bicycle enable rider to optimize bicycle geometry effectively and/or to change either softness of suspension or the range of its modifiability.

The bicycle, with a movable Pedal Assembly with an adjustable basic position, has a Hanger Unit of the Pedal Assembly, which is swivelably and slidably connected to a Frame or to a Seat Assembly or to the front end of a Tail and is lockable against sliding, by a Pedal Lock. The bicycle, with a movable Pedal Assembly and appliances for enhancing lateral rigidity, has a Tail and/or a Hanger Unit of the Pedal Assembly, which are supported against the Frame by at least one Antideviating Strut and/or Antidropping Strut. The bicycle, with a movable Pedal Assembly and with a long and\or beneficially shaped suspension travel path of Rear Wheel, has a Tail movably attached to a Frame by at least two bolts, slidable along defined sliding paths. The bicycle, with movable Seat Assembly embodied outside the room of Rear Wheel suspension travel, has a Seat Assembly equipped with either an arched Seat Post inserted into an equally curved tube of a Seat Carrier or a pair of Seat Posts inserted in a pair of tubular Seat Carriers situated on both sides of a Frame. The bicycle with a movable Handlebar Assembly has its connection firmly attached to a Fork below and above a Head Tube. The bicycle, with a shock absorbing Suspension Assembly which modifiable efficiency, is controlled by one or more Regulating Assemblies, containing either a Locking Mechanism or a Limiting Mechanism (which keeps locking of the shock absorbing function only till the critical magnitude of impact occurs) or a fluently Regulating Mechanism (which can modify wheel elevation range and suspension softness simultaneously). These assemblies interconnect a Frame with a Tail and/or the mutually slidable parts of a telescopic Fork, namely, either independently on attachment provided by a Suspension Assembly or in an arrangement, which is conjoint with a Suspension Assembly. The bicycle, with a Regulating Assembly, which modifies its overall geometry, has at least one Regulating Assembly, comprising either a Reducible Joint or a Control Mechanism attached to a Limiting Mechanism on a Fork and/or to an Expandable Joint between a Suspension Unit and a Frame or a Tail. The bicycle, comprising a modifiable Seat Assembly and/or a modifiable Pedal Assembly and/or a modifiable Handlebar Assembly and/or a shape-modifiable Tail, and/or a shape-modifiable Frame which are mutually interconnected with a Synchronizing Assembly or a Shifting Assembly is attached to them. The bicycle, with a Regulating Assembly, has a Self-Controlling Assembly, attached to a Control Mechanism of the Regulating Assembly and/or to a control of an adjustable Suspension Assembly.

EXAMPLES

Example 1

The bicycle shown on FIG. 1a to 1f comprises assemblies that co-create a Frame System, Motion System, Rider-Positioning System and in some cases also a sprung Suspension System. Said Frame System has a Frame 1, Tail 2 and Fork 3. The Fork 3 is rotatable and mounted on the front end of a Frame 1. A Tail 2 is attached to the rear end of a Frame 1. Said sprung Suspension System has one or more Suspension Assemblies 4. The rear Suspension Assembly 4 interconnects a movable Tail 2 with a Frame 1. The front Suspension Assembly 4 interconnects the mutually sliding parts of a Fork 3. Said Motion System has a Front Wheel 9, Rear Wheel 10 and Drivetrain Assembly 11 which are connected to Frame System assemblies. A Rear Wheel 10 is rotatably attached to a Tail 2. A Drivetrain Assembly 11 connects the Rear Wheel 10 with a Pedal Assembly 6. The Pedal Assembly 6 together with a Seat Assembly 5 and a Handlebar Assembly 7 co-creates the said Rider-Positioning System and are attached to Frame System assemblies. A Handlebar Assembly 7 is firmly attached to the upper part of a Fork 3. A Seat Assembly 5 is firmly attached to a Frame 1. The bicycle embodiment is characterized by a movable connection of a Pedal Assembly 6 to a Frame 1.

Figure 1A:
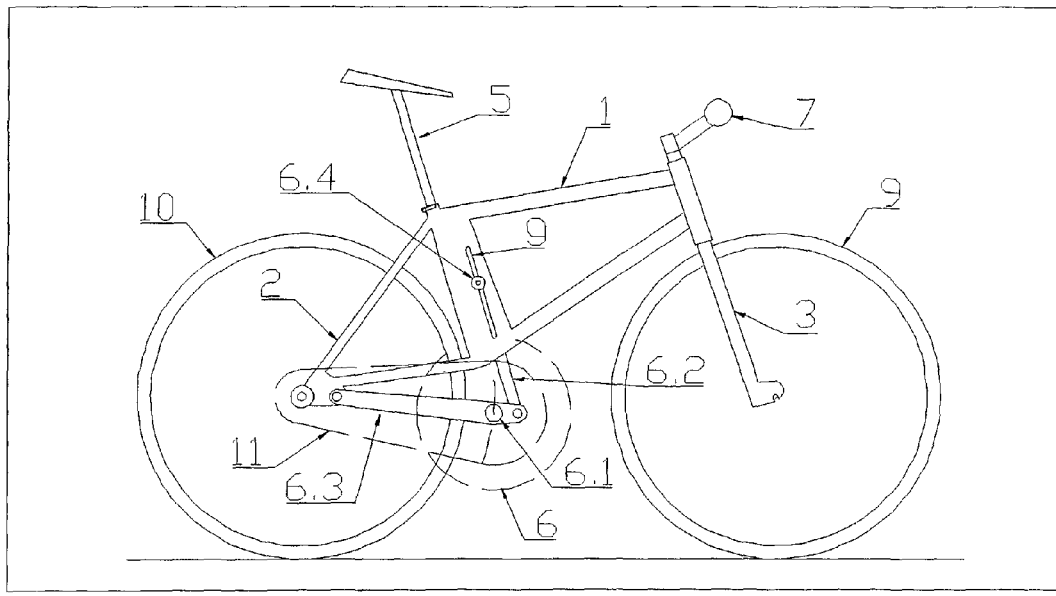
FIGS. 1a to 1f show bicycles with Pedal Assemblies connected movably with respect to their Frames.

FIG. 1a presents an embodiment of a vertically adjustable Pedal Assembly 6, which is slidably connected to a Frame 1. The depicted unsuspended bicycle has a Bottom Bracket 6.1 attached to the Tail 2 by a Distancing Unit 6.3 and to the Frame 1 by a Hanger Unit 6.2 (both of them are designed as mutually connected Swing Arms). The attachment to the Frame 1 is slideble along the path g and lockable by a Pedal Lock 6.4 (which is designed as a typical assembly for connecting two elements, for example an excenter, a pair of claws, or a turn-buckle with respect to a corresponding path, supplemented with a reversible element and a controlling unit).

This embodiment of the bicycle works as follows: After unlocking a Pedal Lock 6.4, the Hanger Unit 6.2, that connects a Pedal Assembly 6 with a Frame 1 can be slid and then, in a new position, locked again by an antishifting Pedal Lock 6.4. In case of a sprung suspended Tail 2 (not depicted in FIG. 1a) a pin of a Hanger Unit 6.2 remains free to rotate and automatically rises up by a Distancing Unit 6.3 when the wheel is elevated. A similar effect can be achieved if the Hanger Unit 6.2 is slidably (or also point wisely) connected to a Tail 2, or to a Seat Assembly 5 (not depicted in FIG. 1a). The advantage of this embodiment is that lifting a Bottom Bracket 6.1 decreases the risk of Pedal Crank impact onto ground undulations. Moreover it optimizes comfort, efficiency, safety and aerodynamics with regard to actual speed and to slope and unevenness of ground.

Figure 1B:
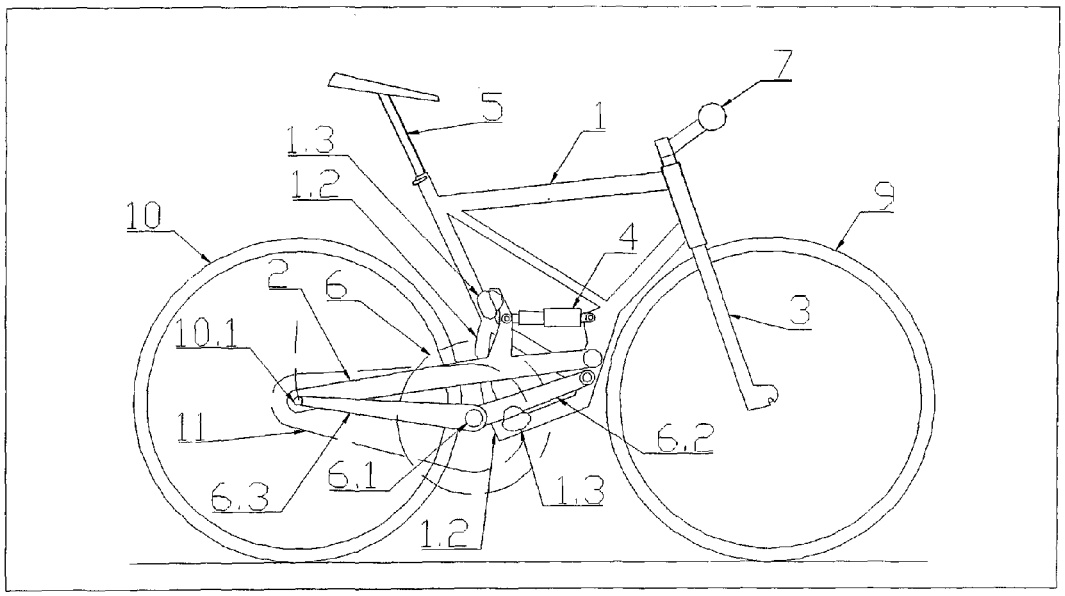

FIG. 1b presents an embodiment of a Pedal Assembly 6, which is turnably connected to the rear end of a Tail 2 (connected either directly or through a Rear Axle 10.1). The depicted bicycle with rear sprung suspension, has a Bottom Bracket 6.1 connected to a Rear Axle 10.1 by a Distancing Unit 6.3 and to a Frame 1 by a Hanger Unit 6.2 (both of them are designed as Swing Arms, preferably coaxially connected with the Bottom Bracket 6.1). The Frame 1 and the Hanger Unit 6.2 are slidably supported by a Lateral Support 1.2. (The Lateral Support 1.2 is designed to form at least two parallel heading joints between connected units, which can move along these joints in a plane without crippling to any side. Minimization of friction can be achieved for example by exact surface treatment, by rolling elements, or by magnets oriented in the same direction.) A Tail 2 (designed as a lever, connected by a pivot) is laterally supported by another Lateral Support 1.2 (designed all the same as the previous one, whereby both of them may share a common contact surface on a Frame 1). A Frame 1 and a Tail 2 are mutually supported also with a Bottom Support 1.3 (designed to form a heading joint of connected units with reciprocal superficies, in some cases provided with convenient elements for absorbing impacts, for example springs, layers of cushioning material, magnets oriented in the same direction) which supports the Tail 2 in its lowest position. Also another Bottom Support 1.3 may support the Hanger Unit 6.2 in its lowest possible position.

Figure 1C:
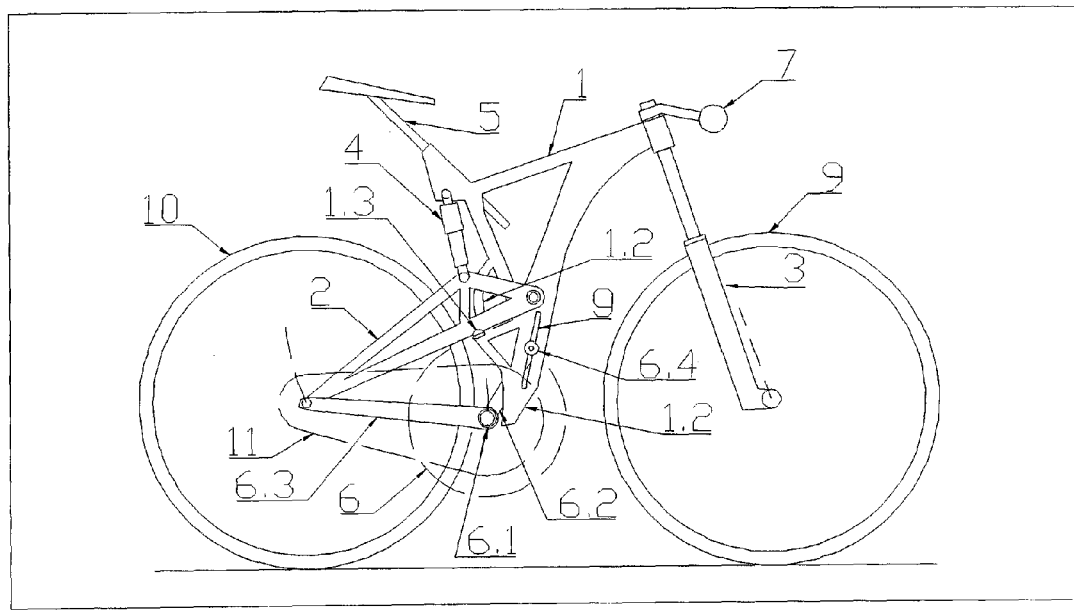
Figure 1D:
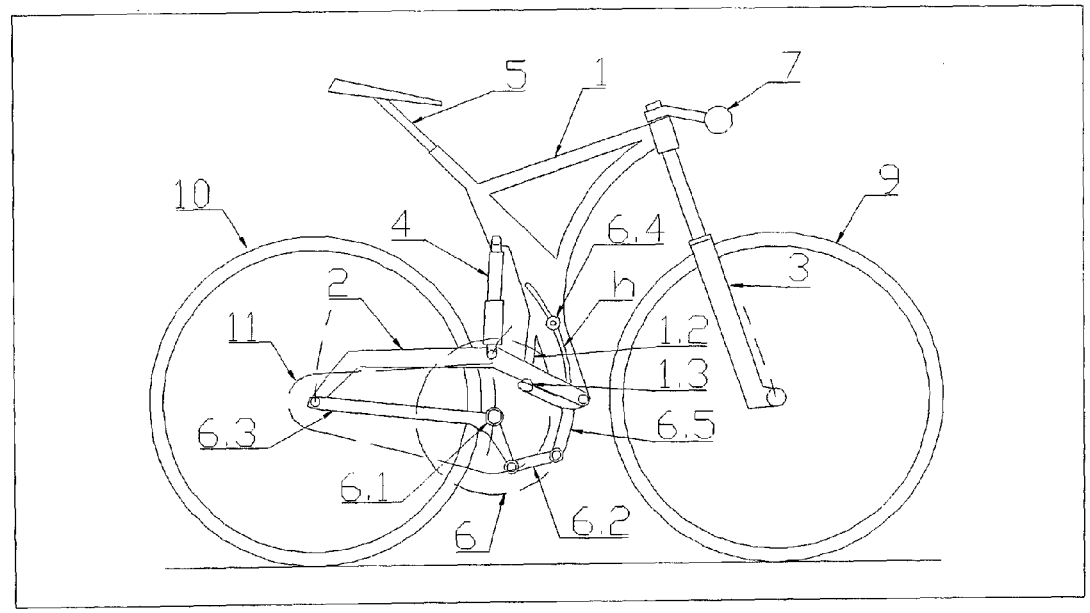

FIGS. 1c and 1d show embodiments of a Pedal Assembly 6, combining the connections depicted in FIGS. 1a and b.

FIG. 1c presents a Pedal Assembly 6, turnably connected to a Frame 1 by a slidable Hanger Unit 6.2. The depicted bicycle differs from the previous one in that the Hanger Unit 6.2 is connected to the Frame 1 slidably along the path g and in its lockability by an antisliding Pedal Lock (which is designed in like manner as that in the first variant, but in such arrangement which enables lockout against sliding without limiting Hanger Unit 6.2 in freedom to rotate).

FIG. 1d presents an embodiment of a Pedal Assembly 6; turnably connected to a Frame 1 by a slidable Hanger Unit 6.2 and a Sliding Unit 6.5 (designed as for example a plug-in cantilever, sliding cantilever or sliding assembly with a variable geometry). The depicted bicycle differs from the previous one in that its Hanger Unit 6.2 is connected to a Frame 1 by a Sliding Unit 6.5 (which is designed as a plug-in cantilever) slidable on the Frame 1 along the path h and lockable to the Frame 1 by a Pedal Lock 6.4.

Figure 1E:
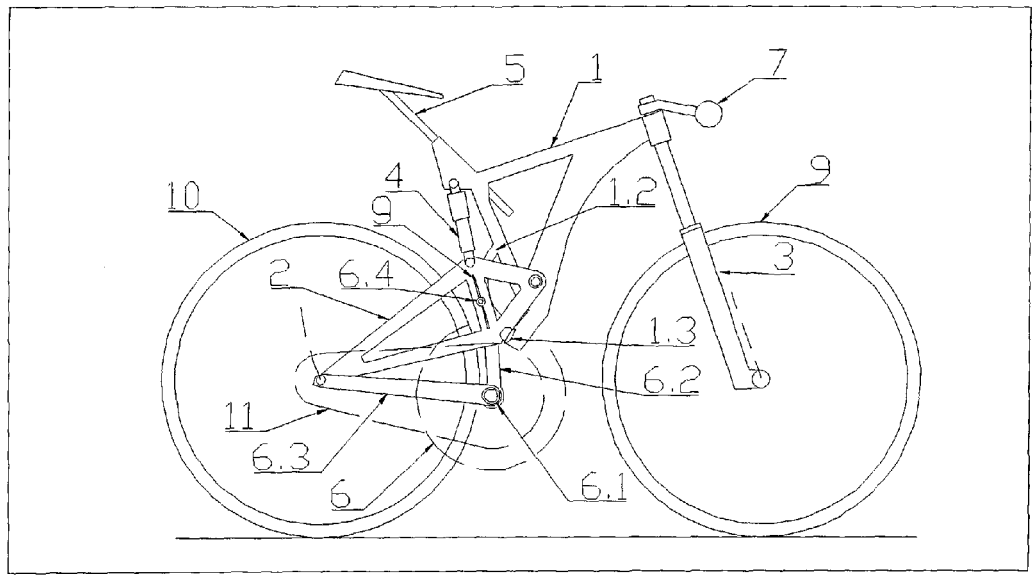

FIG. 1e presents an embodiment of a Hanger Unit 6.2 which is connected to another bicycle part, movably connected to a Frame 1. The depicted bicycle is the same as that in the FIG. 1c with a difference that its Hanger Unit 6.2 is connected to a Tail 2 slidably.

Figure 1F:
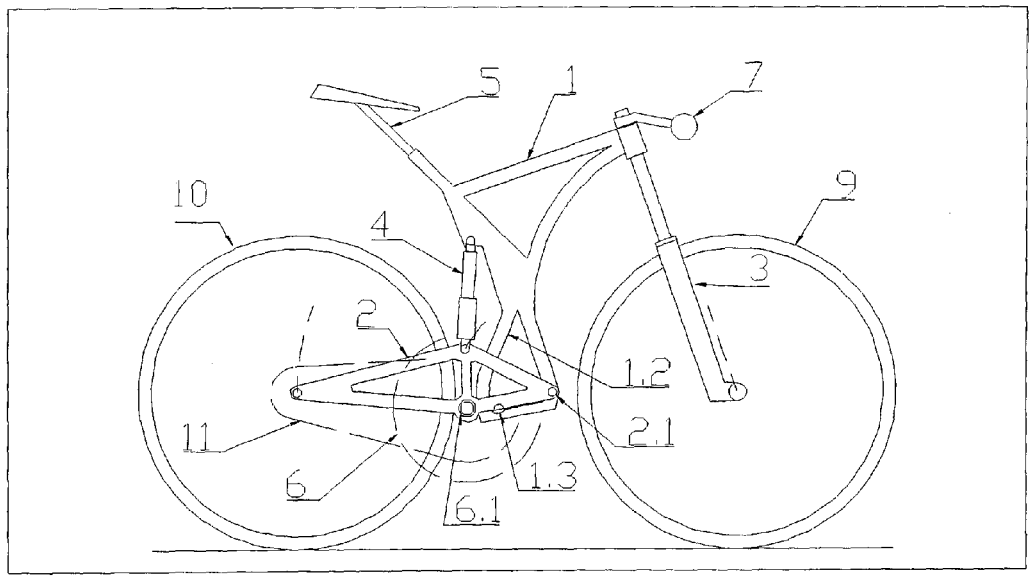

FIG. 1f presents the embodiment of a Pedal Assembly 6, immovably connected to a Tail 2. A Bottom Bracket 6.1 of the depicted bicycle is attached directly to a Tail 2.

The embodiments of the bicycle depicted on FIGS. 1b-f work as follows: A Rear Wheel 10 and a Bottom Bracket 6.1 remain mutually braced (by a Distancing Unit 6.3 or a Tail 2), while in shock absorbing. Consequently the Bottom Bracket 6.1 is allowed to move independently from a Frame 1, what is advantageous because of preventing waste of energy in a Drivetrain Assembly 11 due to drawing a Rear Wheel 10 towards the Frame 1 and thus due to compression of a Suspension Assembly 4. Another advantage is that the independence of a Pedal Assembly 6 from a Frame 1 generates some new constructional possibilities for location and for concept of connecting Tail 2 to a Frame 1 and so enables a more straight-line trajectory of wheel elevation and/or a smaller forward component of the wheel elevation. Additional advantage is a possibility to support a Tail 2 in its bottom position by a Bottom Support 1.3, what is typically required for riding on smooth-surfaced paths. Such supporting ensures transmission of all the energy from a wheel directly to a Frame System, without wasting energy for lifting a Tail 2 and for compressing a Suspension Assembly 4. Moreover, convenient shaping of contact surfaces increases lateral rigidity of the bicycle.

Example 2

Figure 2A:
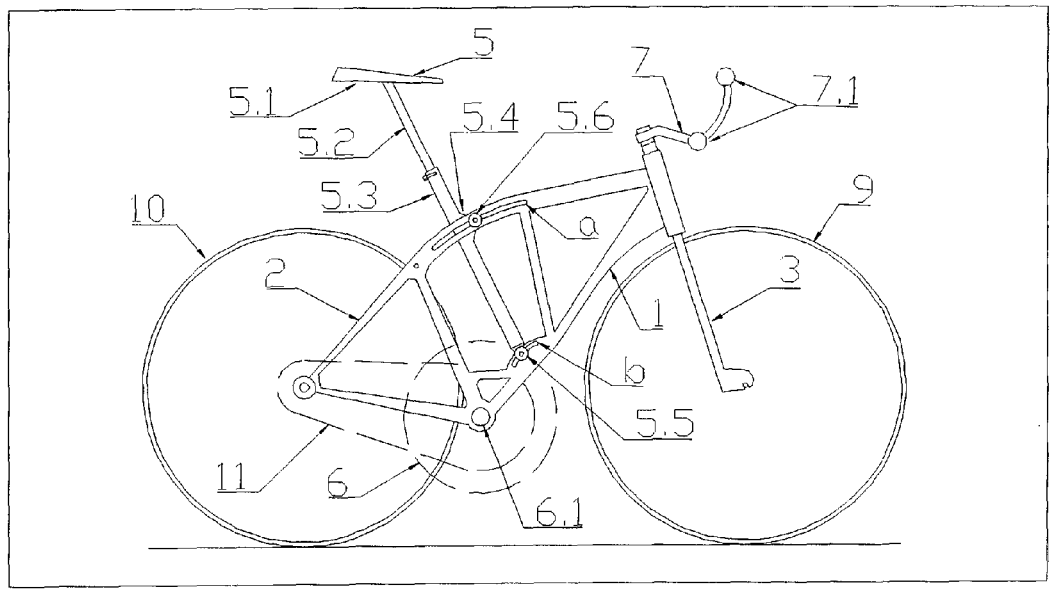
FIGS. 2a to 2c show bicycles which have their Seat Assemblies connected movably with respect to their Frames.
Figure 2B:
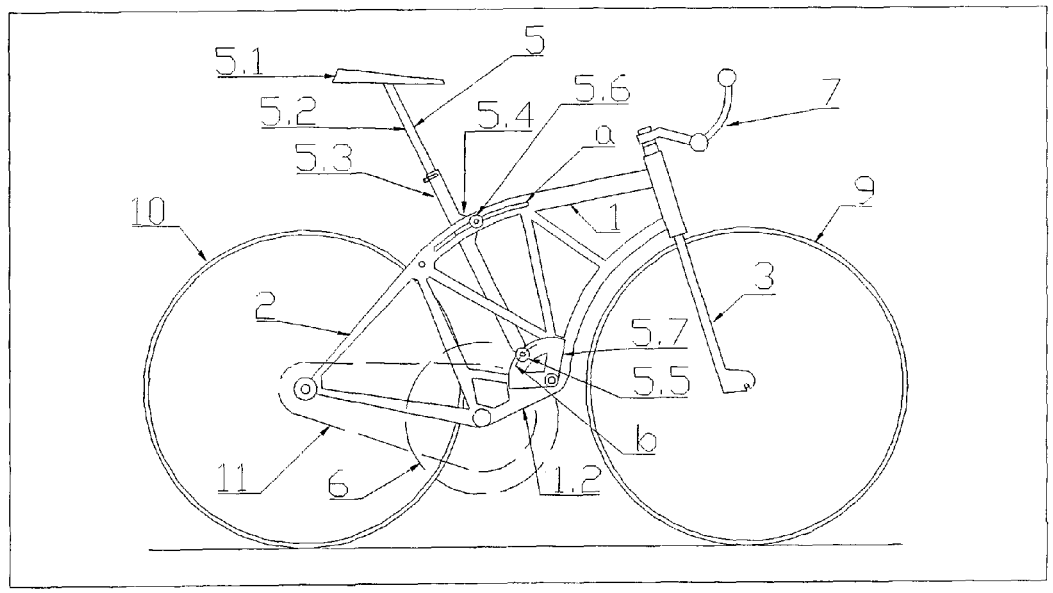
Figure 2C:
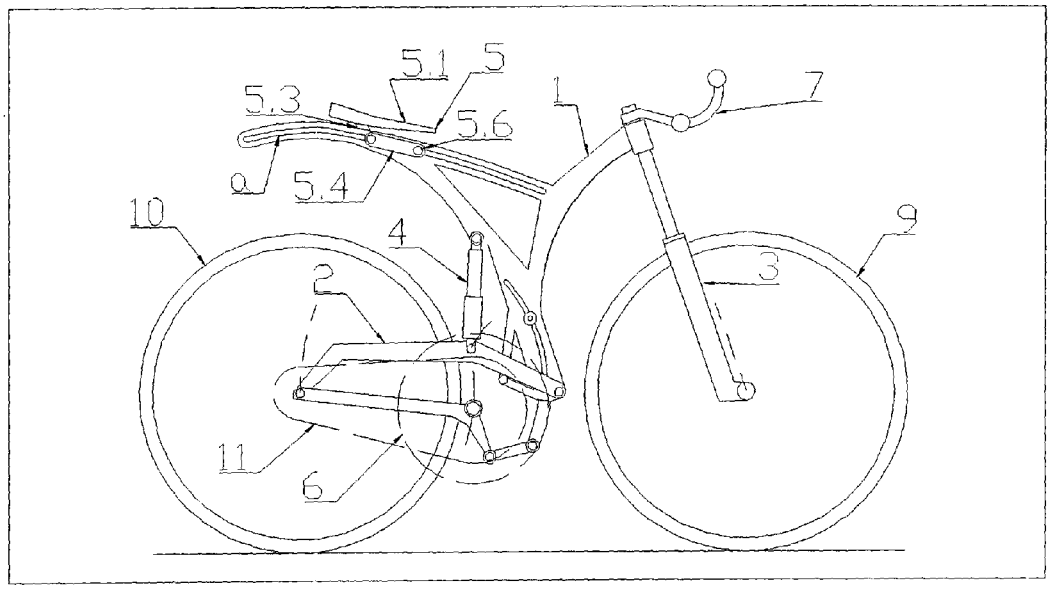

The bicycle shown on FIGS. 2a to 2c comprises Frame System assemblies (Frame 1, Tail 2, Fork 3), a Motion System assemblies (Front Wheel 9, Rear Wheel 10, Drivetrain Assembly 11) and in some cases a Suspension System assemblies (Suspension Assemblies 4), which are alike as those in the Example 1. A Rider-Positioning System has a Handlebar Assembly 7 alike as that in the Example 1 and a Pedal Assembly 6 either the same as in the Example 1 or with a Bottom Bracket 6.1 commonly connected to a Frame 1. The bicycle is featured with a movable (with respect to the Frame 1) connection of a Seat Assembly 5 which is lockable by at least one Seat Lock 5.6.

FIG. 2a presents an embodiment of a Seat Assembly 5, connected to a Frame 1 by Clamp Holders 5.4 and 5.5, which are slidable along the paths a and b. The depicted bicycle has a Seat 5.1 connected by a telescopic Seat Post 5.2 to a Seat Carrier 5.3, which is slidably connected to a Frame 1 and lockable by a Seat Lock 5.6 (designed alike as the Pedal Lock in the previous example, except that, in this case, the locking of not only sliding motion but also turning motion is tolerable). A Handlebar 7.1 of a Handlebar Assembly 7 may be arranged for various positions of hands.

FIG. 2b presents an embodiment of a Seat Assembly 5, attached by a Swing Bar 5.7. The depicted bicycle is the same as the previous one with a difference in connecting a Bottom Connector 5.5 to a Frame 1, which is provided through a Swing Bar 5.7. The Frame 1 has a Lateral Support 1.2 (designed alike as that in Example 1), which laterally supports a Swing Bar 5.7 and in some cases also a Seat Carrier 5.3.

FIG. 2c presents an embodiment of a Seat Assembly 5 connected by a Top Connector 5.4, which is not rotatably slidable along the path a, located on a Frame 1. The depicted bicycle is the same as that in FIG. 1d with a difference in a slidable Top Connector 5.4 (designed as a roller), which is movable along the path a, on a Frame 1 and lockable by a Seat Lock 5.6. A Seat 5.1 is attached to a sliding Top Connector 5.4 by a Seat Carrier 5.3.

The embodiments of the bicycle depicted on FIGS. 2a to 2c works as follows: After unlocking a Seat Lock 5.6, a Seat Assembly 5 becomes slidable with regard to a Frame 1 and, after achieving a new position, can be locked again by a Seat Lock 5.6. The advantage of this solution is that rider can optimize the Seat 5.1 position, considering actual speed, slope and unevenness of ground, comfort, performance, safety and aerodynamics.

Example 3

The bicycle depicted on FIGS. 3a to 3d comprises Frame System assemblies (Frame 1, Tail 2, Fork 3), Motion System assemblies (Front Wheel 9, Rear Wheel 10, Drivetrain Assembly 11) and in some cases has a Suspension System (Suspension Assemblies 4), which are alike as those in the Example 1. A Rider-Positioning System has a Seat Assembly 5 and a Pedal Assembly 6 alike as those in the Example 1 or 2. The bicycle is featured with a Handlebar 7.1 connection which is movable with respect to the Fork 3 and lockable by at least one Handlebar Lock 7.3. Another possible feature is multiple connection of Handlebar Assembly 7 to a Fork 3, below and above a Head Tube 1.1.

Figure 3A:
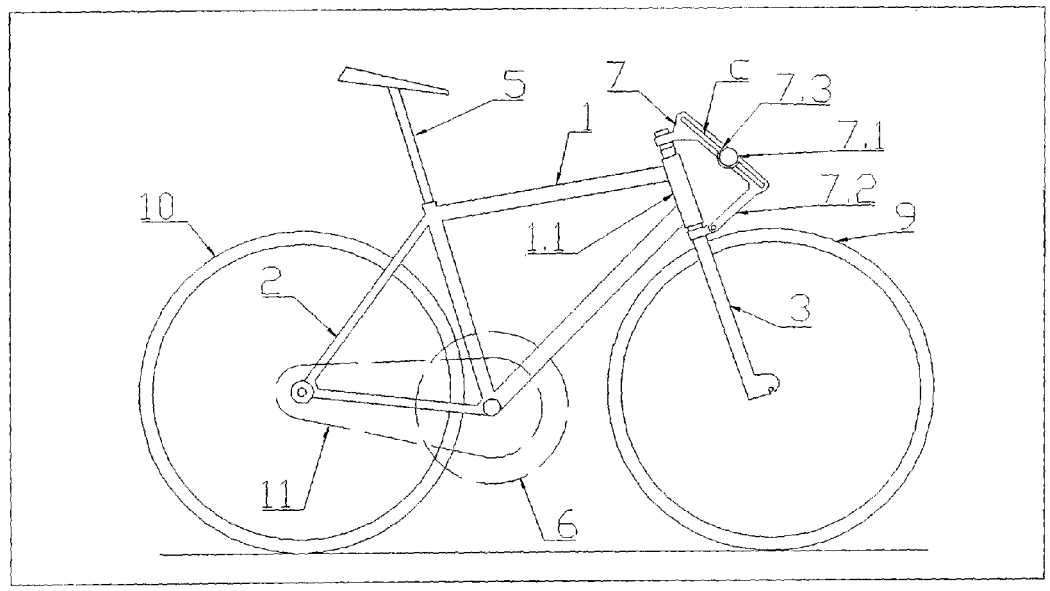
FIGS. 3a to 3d show bicycles with Handbars connected movably with respect to their Forks.
Figure 3B:
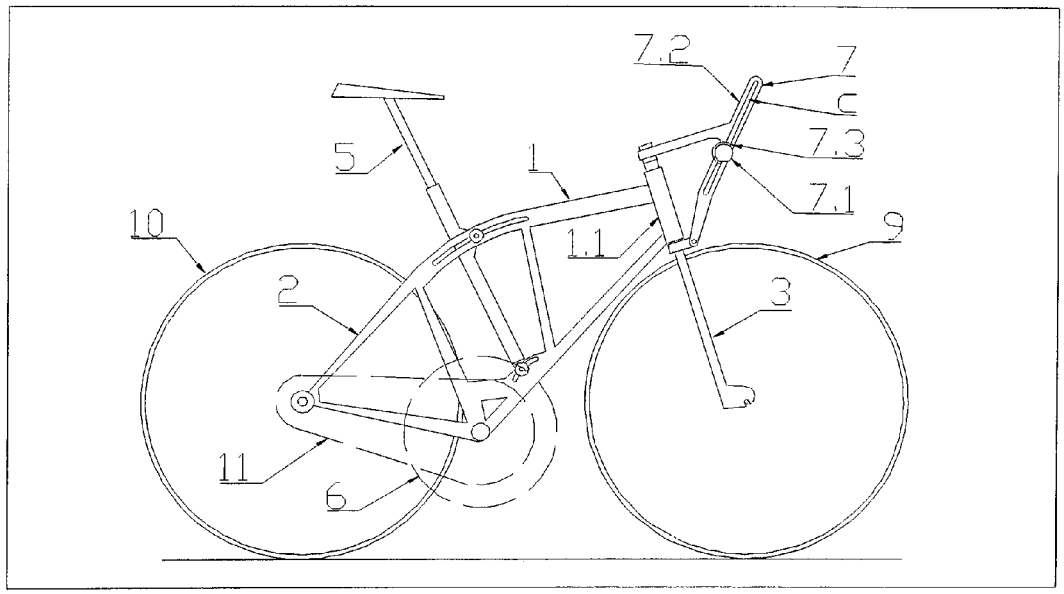

FIGS. 3a and 3b present the embodiment of a Handlebar Assembly 7, with a Handlebar 7.1 connected slidably (and in some cases also freely to rotation) along the path c on a Carrier 7.2. The embodiment of a bicycle depicted in FIG. 3a has an unslidable Seat Assembly 5 and a Pedal Assembly 6. Therefore, the shape of a Carrier 7.2 is accommodated to the path c which links the usual position of a Handlebar 7.1 with its position lowered and forwarded for steep climbing. The Carrier 7.2 is connected to a Fork 3 above and below a Head Tube 1.1. The Handlebar 7.1 is lockable by a Handlebar Lock 7.3 toward the Handlebar Carrier 7.2 (designed alike locks of slidable assemblies mentioned in previous examples). The bicycle depicted in FIG. 3b has a slidable Seat Assembly 5. Therefore the shape of the Carrier 7.2 is assimilated to the path c connecting the upper-front position (for sitting with upright body on the Seat 5.1 forwarded for uphill ride) with the bottom-rear position (for sitting with forward leaned body on the Seat 5.1 backwarded for downhill ride).

Figure 3C:
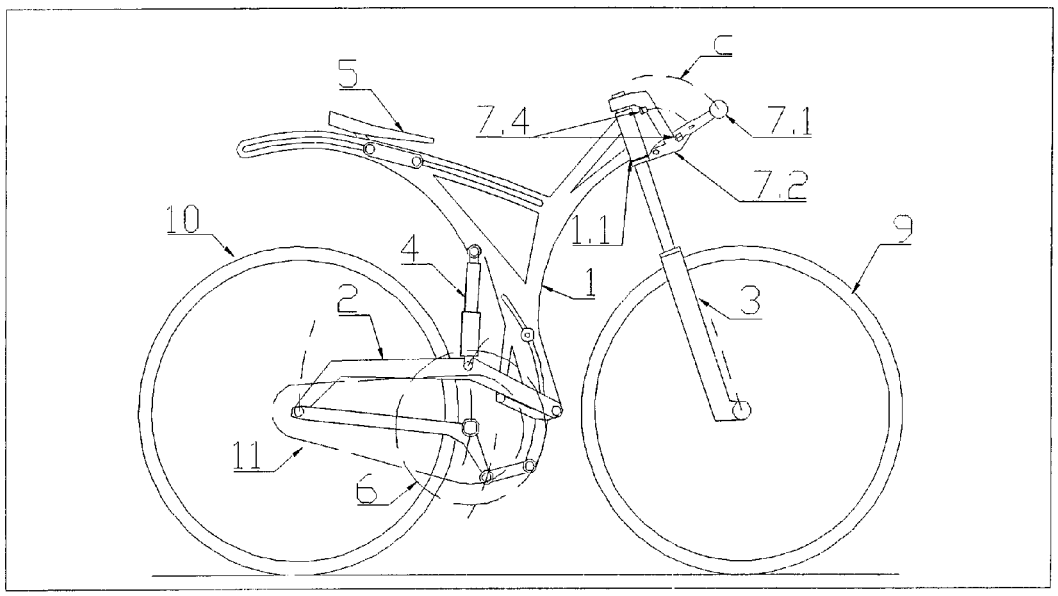

FIG. 3c presents an embodiment of a Handlebar Assembly 7, with a Handlebar 7.1 connected to a sectionalized Carrier 7.2 (designed as modifiable-geometry equipment) which is lockable into a rigid unit at least in two positions by at least one Handlebar Carrier Lock 7.4. The depicted embodiment of a bicycle has a Handlebar Carrier 7.2 (designed as a system consisting of a fixed part and a movable part, connected to each other by a pivot pin) movable parts (mutually supported by a Lateral Support 1.2 and a Bottom Support 1.3, equal as that in the Example 1) which are lockable in their extreme positions by two Handlebar Locks 7.3 (designed as sprung hooks which fits into opposite sleeves).

Figure 3D:
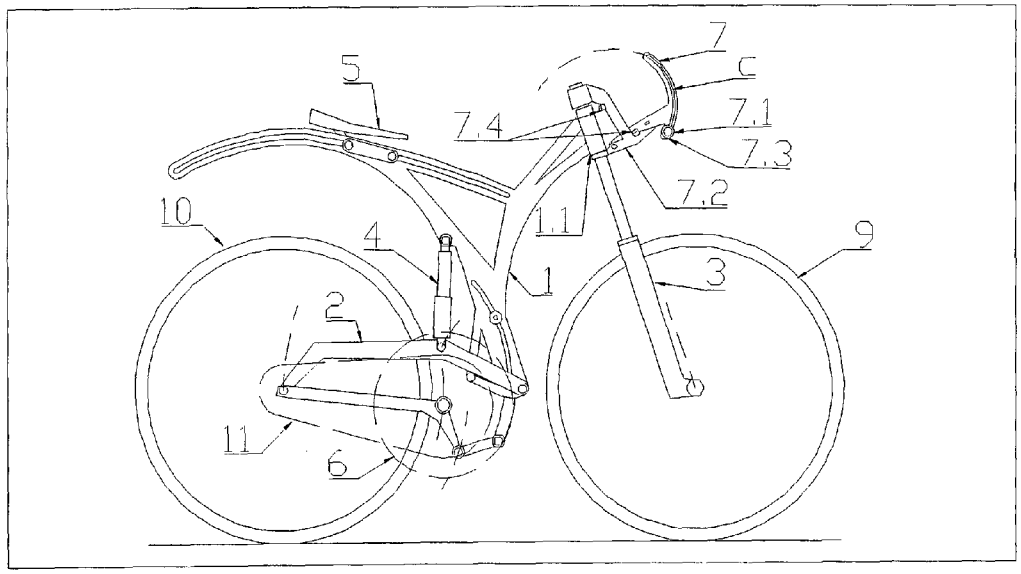

FIG. 3d presents an embodiment of a Handlebar Assembly 7, combining the previous solutions. The depicted bicycle has a sectionalized Handlebar Carrier 7.2 to which a Handlebar 7.1 (designed so that the path c is on the movable part and in some cases that a Handlebar Lock 7.3 and a Handlebar Carrier Lock 7.4 have coupled controls) is slidably attached.

The embodiments of the bicycle shown on FIGS. 3a to 3d works as follows: After unlocking a Handlebar lock 7.3 and/or a Handlebar Carrier Lock 7.4, the Handlebar 7.1 position with respect to a Fork 3 can be changed (in some cases also moved round) by sliding along the path c and/or by changing geometry of said sectionalized Handlebar Carrier 7.2 and then to be locked again in the new position by the Handlebar Locks 7.3. It facilitates the advantageous optimizing position of a Handlebar 7.1 with reference to actual speed, slope and unevenness of ground, comfort, performance, safety and aerodynamics.

Example 4

The bicycle shown on FIGS. 4a to 4l comprises a Frame System (a Frame 1, Tail 2, Fork 3), which is sprung at least at the back end, a Motion System (a Front Wheel 9, Rear Wheel 10, Drivetrain Assembly 11) and a Suspension System (Suspension Assemblies 4), which are alike as those in the Example 1 and a Rider-Positioning System (a Seat Assembly 5, Pedal Assembly 6, Handlebar Assembly D. The assemblies of the depicted bicycle are alike those in the Example 1 or 2 or 3. The bicycle is featured with a Regulating System, containing one or more Regulating Assemblies 8, bracing a Frame 1 and a Tail 2 mutually. A Regulating Assembly 8 comprises a Locking Mechanism 8.2 and/or a Limiting Mechanism 8.3 and/or an Adjusting Mechanism 8.4, which connects a Frame 1 with a Tail 2 either independently on a Suspension Assembly 4 or in aggregation with it. Any Regulating Assembly 8 may contain also one or two Controlling Mechanisms 8.1.

The FIGS. 4a to 4d shown embodiments of a Regulating Assembly 8, comprising a Locking Mechanism 8.2 and a Controlling Mechanism 8.1.

Figure 4A:
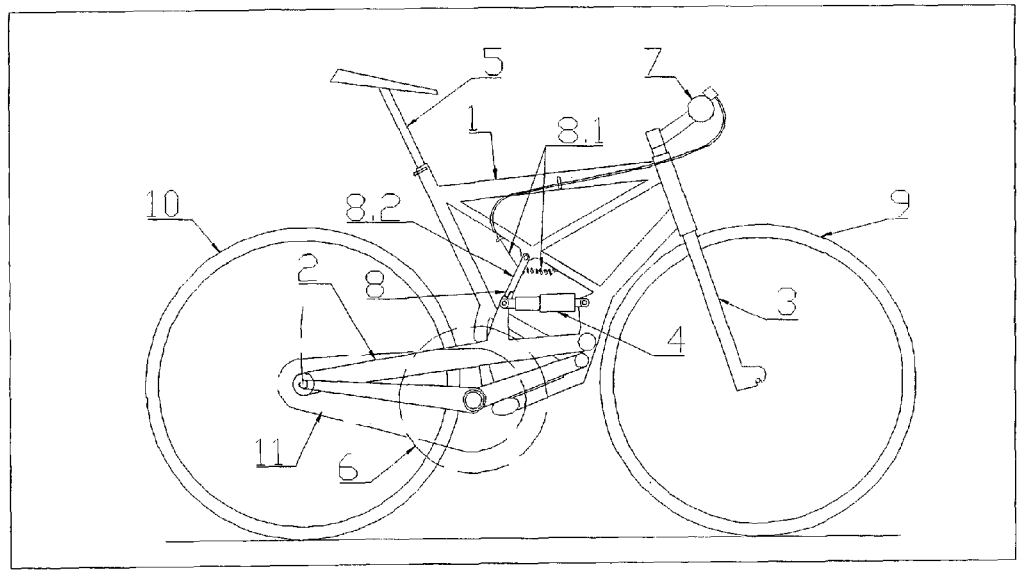
FIGS. 4a to 4m show bicycles with Regulating Systems spacing their Tails with respect to their Frames.

The FIG. 4a presents an embodiment of a disconnect-able Locking Mechanism 8.2 (designed as an assembly, commonly used for coupling two mutually movable elements, for example a tilting strut and a footing, or a hook and a socket). A Controlling Mechanism 8.1 (designed as an equipment commonly serving for conversions of mutual positions of elements, for example a pair of stranded wires acting in opposite directions, a bar element or a stranded wire acting against a reversing element or against a force of another part of bicycle, or a hydraulic system etc., which may be supplemented with a manual control) is attached to the movable part of a Locking Mechanism 8.2. The depicted bicycle is the same as that in the FIG. 1b with a difference that this one is supplemented with a Regulating Assembly 8 (like all the following bicycles in this example) which has a Controlling Mechanism 8.1 (designed as a stranded wire acting against a reversing element) connected to a Locking Mechanism 8.2 (designed as a tilting strut and a footing).

Figure 4B:
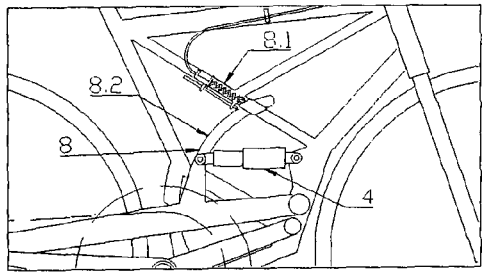

FIG. 4b presents an embodiment of an insertable Locking Mechanism 8.2 (designed as an insertable equipment for example a cylinder with a piston or a telescopic strut supplemented with a plugging-in lock). A Controlling Mechanism 8.1 is attached to a Locking Mechanism 8.2 (to its plugging-in lock). The depicted bicycle has a Controlling Mechanism 8.1 (designed as a stranded wire acting against a reversing element) connected to a Locking Mechanism 8.2 (designed as an insertable strut in an opposite slipping sleeve with a lock).

Figure 4C:
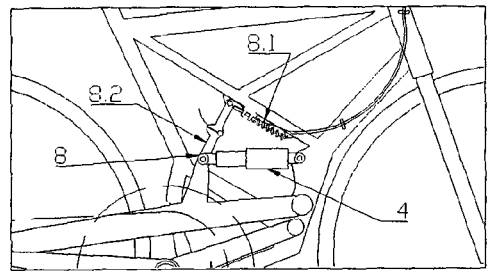

FIG. 4c presents an embodiment of a shape-modifying Locking Mechanism 8.2 (designed as equipment with movable parts, for example a multi pivotal statically indeterminate structure, supplemented with a lock). A Controlling Mechanism 8.1 is attached to a Locking Mechanism 8.2 (to its movement lock). The depicted bicycle has a Controlling Mechanism 8.1 connected to a shape-varying Locking Mechanism 8.2 (designed as a cranking strut with a cranking lock).

Figure 4D:
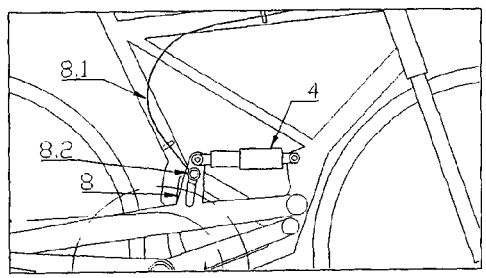

FIG. 4d shows an embodiment of a clutch-type Locking Mechanism 8.2 (designed as a clutch or a lock used in movable equipments, mentioned in the previous examples). The depicted bicycle has on its Frame 1a clutch-type Locking Mechanism 8.2 (designed as a thrust clutch) which passes through a groove on a Tail 2 and is connected to a Controlling Mechanism 8.1. The embodiments of the bicycle depicted on FIGS. 4a to 4d work as follows. A Locking Mechanism 8.2 is converted to a rigid unit by a Controlling Mechanism 8.1. Then this rigid unit connects a Tail 2 with a Frame 1. Consequently, a rear-suspended Frame System converts to an unsuspended one and vice versa. The advantage of such connecting and disconnecting of the rear-suspension is in possibility to optimize performance, safety and comfort.

FIGS. 4e to 4i show embodiments of a Regulating Assembly 8, containing a Limiting Mechanism 8.3 and in some case also a Controlling Mechanism 8.1.

Figure 4E:
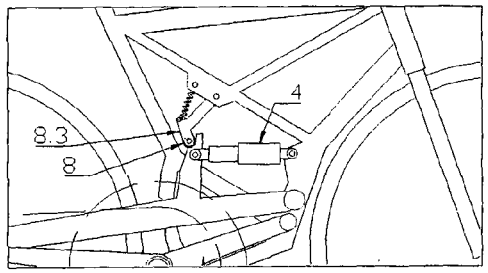

FIG. 4e presents an embodiment of an uncontrolled Limiting Mechanism 8.3 (designed as an equipment serving for holding two mutually movable elements in mutual conjunction, against the influence of a force with a sublimit magnitude, for example a sprung latch, a magnetic joint, a strut with limited buckling rigidity etc.) The depicted bicycle has an uncontrolled Limiting Mechanism 8.3 (designed as a sprung latch with an opposite footing, adapted to the shape of an aperture, suitable for fitting latch in the un-lifted state of a Tail 2 and, behind a separating threshold, a sliding plane for a latch embossed from an aperture in the lifted state of a Tail 2).

Figure 4F:
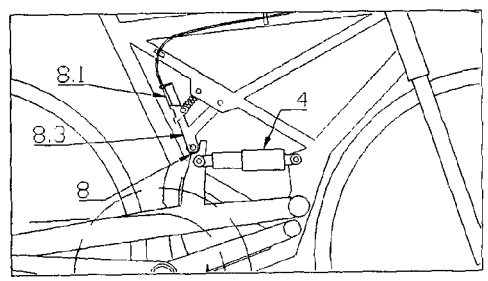
Figure 4G:
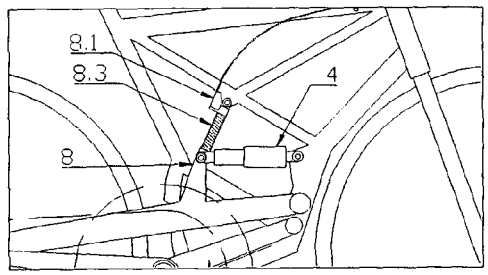

On the FIGS. 4f and 4g there are depicted embodiments of an adjustable Limiting Mechanism 8.3 (designed similarly as an un-adjustable one, but supplemented with a movable part, position of which can change its effectiveness), which is connected to Controlling Mechanism 8.1 (to its movable parts).

The bicycle shown in the FIG. 4f has a Limiting Mechanism 8.3 smoothly adjustable (designed as a sprung latch with an opposite footing and supplemented with a movable part, which pushes a sprung latch to the sleeve using the force, corresponding to its actual position). A Controlling Mechanism 8.1 (designed as equipment, which enables shifting and locking the movable part) is connected to a Limiting Mechanism 8.3. The bicycle shown in the FIG. 4g has an on-off switchable Limiting Mechanism 8.3 (designed as a strut formed by a close-coiled spring) which is connected with a Controlling Mechanism 8.1 (designed as an element serving for deflecting the close-coiled spring from its directness).

Figure 4H:
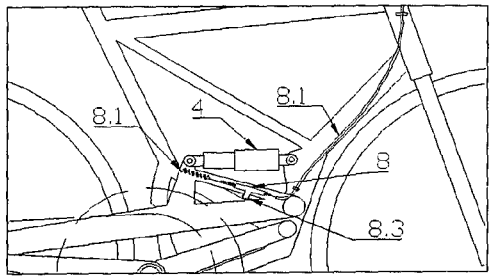
Figure 4I:
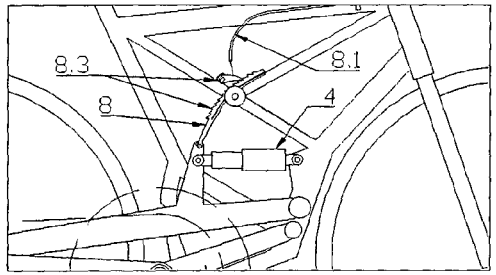

FIGS. 4h and 4i show embodiments of a Limiting Mechanism 8.3, (designed as either an equipment with a slidable element or an equipment with a variable geometry element, which in certain settings lifts a Tail 2) affecting against a Suspension Assembly 4. A Controlling Mechanism 8.1 is connected to the said Limiting Mechanism 8.3.

The bicycle shown in the FIG. 4h has a Limiting Mechanism 8.3 (designed as the slidable Bottom Support in Example 1), which supports a Tail 2 and can change its elevation by pushing.

The bicycle depicted in the FIG. 4i has a Limiting Mechanism 8.3 (designed as a tie band with toothing and a latch), which can change forced elevation of a Tail 2, using tensile force.

The embodiments of the bicycle shown in the FIGS. 4e to 4i works as follows: A Limiting Mechanism 8.3 prevents lifting a Tail 2 when smaller forces are acting, but lets it free to allow elevation of sprung suspension when any larger force occurs. Resistance power of the Limiting Mechanism 8.3 against the larger forces can be adjustable and/or detachable by a Controlling Mechanism 8.1. As for the bicycle, according to FIG. 4i, movements of a Tail 2 with regard to a Frame 1, may be provided by some intentional wobbling of rider's body. The wobbling is a source of the power which performs displacement or at least relieving of displaced elements. Automatic activation of disconnected suspension, caused by occurrence of a stronger impact, is a significant advantage of this design. Another advantage is reduction of jerking a Tail 2, due to pedalling, and thus elimination of one of the major causes of energy losses, typical for suspension bicycles.

Figure 4J:
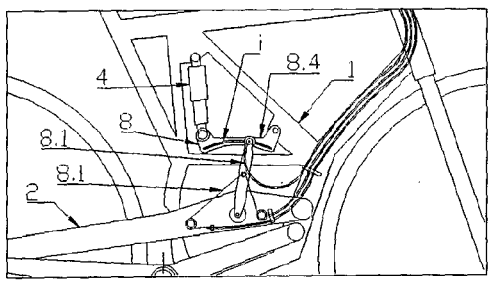
Figure 4K:
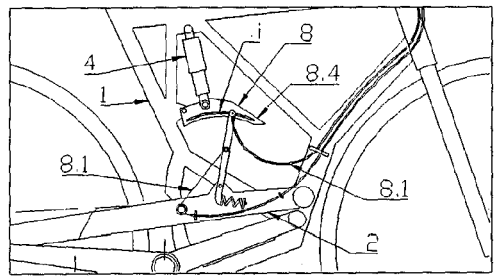
Figure 4L:
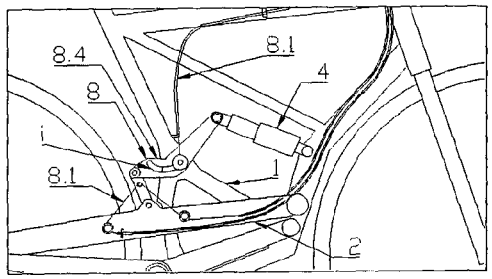

The FIGS. 4j to 4l show embodiments of a Regulating Assembly 8 with an Adjusting Mechanism 8.4 and two Controlling Mechanisms 8.1. A Suspension Assembly 4 is attached to an Adjusting Mechanism 8.4, connecting a Frame 1 with a Tail 2. The length of the Arm of Force actuating from a Suspension Assembly 4 onto a Tail 2 is changeable by an Adjusting Mechanism 8.4 (designed as changeable geometry equipment, with a telescope, a lever or a movable joint). Said Regulating Assembly 8 has two Controlling Mechanisms 8.1. One of them is changeability of the length of the Arm of Force and the second one is lockability of chosen alignment (which can have a conjoint manual control and in some cases also a conjoint wire strand, but has no conjoint reversing elements). The first of those Controlling Mechanisms 8.1 may be equipped with a Straining Unit 8.5 (designed as equipment for generating and transmitting motion—not shown in FIGS. 4j to 4l).

The bicycle shown in FIG. 4j has an Adjusting Mechanism 8.4 (designed as a pair of mutually connected swing bars and antisliding lock). The movable parts of the Adjusting Mechanism 8.4 are mutually slidable along the path i (situated on the Adjusting Mechanism 8.4) and lockable against this sliding. The length of the path i is limited to be placed between the two points where the Adjusting Mechanism 8.4 is connected to both a Frame 1 and a Suspension Assembly 4.

The bicycle depicted on the FIG. 4k has an Adjusting Mechanism 8.4 which differs from the other ones only in the length of the path i, which exceeds behind the connection point of a Suspension Assembly 4. The bicycle depicted on the FIG. 4l differs from the other ones in that an Adjusting Mechanism 8.4 contains a groove for the path i, enabling its locking against displacement motion with respect to Frame 1. The embodiments of the bicycle depicted on FIGS. 4j to 4l works as follows: An Adjusting Mechanism 8.4 can change softness of suspension of a Tail 2 and its maximum elevation by adjustment of its geometry, so that the slidable pin keeps its freedom to rotate even in its locked state. The advantage of this solution is that a rider can change softness and elevation range of the rear sprung suspension, fluently from its maximum to the full shutdown. Said changes take place in exploiting full elevation capacity of a Suspension Assembly 4 and so enable optimizing comfort, performance and safety.

Figure 4M:
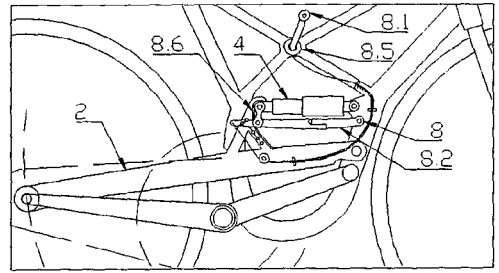

FIG. 4m shows an embodiment of a Regulating Assembly 8 with a Controlling Mechanism 8.1 equipped with a Straining Unit 8.5. (designed as a common equipment for generating and transmitting motions), which is attached to an Extensible Joint 8.6 (designed as for example a hydraulic piston, a screw line, a tipping lever, sliding wedges) placed between a Suspension Assembly 4 and a Frame 1 or a Tail 2.

The shown bicycle has a Straining Unit 8.5 (designed as a manual winch) which is attached via a Locking Mechanism 8.2 (designed as a breaking strut) to an Extensible Joint 8.6 (designed as a contact wheel with a towing joint of a Suspension Unit and a latch attached to the breaking strut of a Locking Mechanism 8.2 and a contact surface with an inclined plane and a series of openings for the latch placed on a Tail 2) which stretches a Suspension Assembly 4 against a Tail 2

The embodiment of the bicycle shown in FIG. 4m works as follows: After triggering Straining Unit 8.5, a Linkage Arrangement 4.2 is activated. At first, it locks the sprung suspension and then, by further tightening, transfers the generated force to resizing an Extensible Joint 8.6. By this action a Tail 2 is pushed downwardly and a Rear Wheel 10 retreats, along an arched path, from its primary position downwardly and frontwardly. (With the depicted bicycle the said activation is realized by locking-off winch crank and winding wire strand, which at first releases the latch from the opening and then adducts the contact wheel by breaking strut. The contact wheel pushes a Tail 2 via the contact surface of an inclined plane downwardly until the latch achieves a suitable opening.) Lowering a Rear Wheel 10 is advantageous because changing of the gravity center decreases risk of lifting Front Wheel 9 while steep uphill driving. It is especially convenient with the bicycles having a slidable Seat Assembly 5 (not depicted), when said combination enhances comfort and performance in climbing.

Example 5

The bicycle shown on FIGS. 5a to 5f comprises at least a front suspended Frame System (a Frame 1, Tail 2, Fork 1), a Motion System (a Front Wheel 9, Rear Wheel 10, Drivetrain Assembly 11) and a sprung Suspension System (Suspension Assemblies 4), which are the same as those in the Example 1 and a Rider-Positioning System (a Seat Assembly 5, Pedal Assembly 6, Handlebar Assembly 7), the assemblies of which are the same as those in the Example 1 or 2 or 3. And in some cases has also a Regulating System (Regulating Assemblies 8) the same as that in the Example 4. The bicycle is featured with a Regulating System containing one or more Regulating Assemblies 8 (designed equally as those in the Example 4) which, together with a front Suspension Assembly 4, spans mutually slidable parts of a telescopic Fork 3.

Figure 5A:
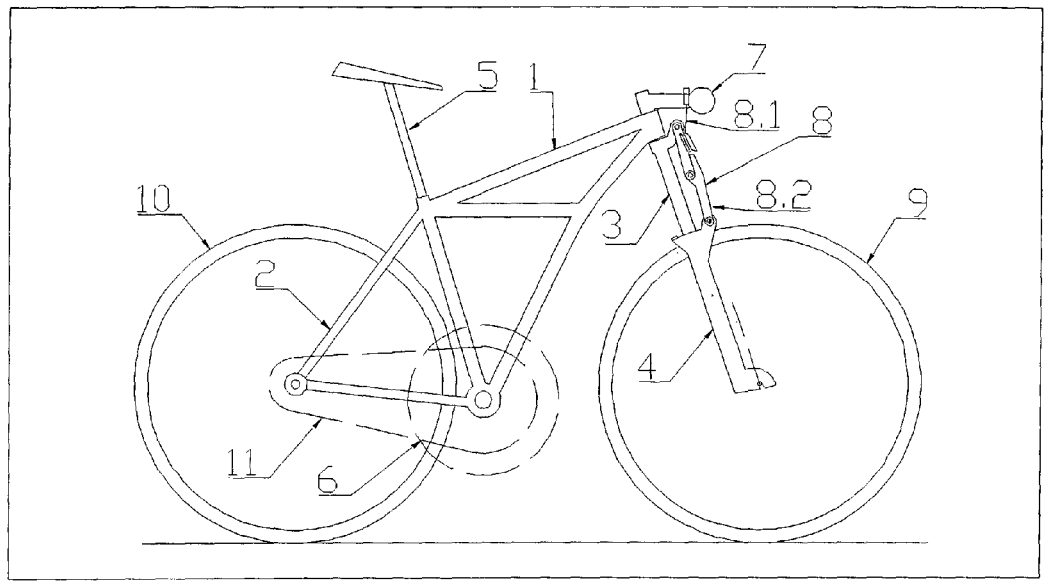
FIGS. 5a to 5e show various types of bicycle Regulating System, which struts movable parts of a Fork with respect to each other.
Figure 5B:
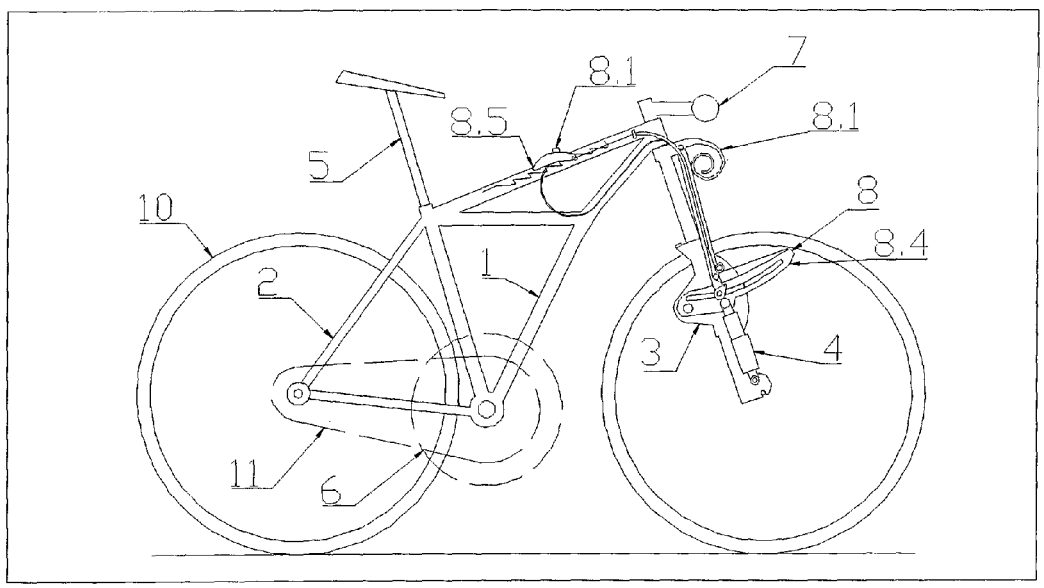

FIGS. 5a and 5b show embodiments of Regulating Assemblies 8 equal to those in Example 4.

FIG. 5a shows an embodiment of a Regulating Assembly 8 (containing a Locking Mechanism 8.2 or a Limiting Mechanism 8.3) on a Fork 3 with inner Suspension Assemblies 4. The depicted bicycle has a Controlling Mechanism 8.1 and a Locking Mechanism 8.2 (designed as a breaking strut) which independently interconnects lower and upper parts of a Fork 3.

FIG. 5b shows an embodiment of a Regulating Assembly with an Adjusting Mechanism 8.4 to which an external Suspension Assembly 4 is connected. The depicted bicycle has an Adjusting Mechanism 8.4 (designed as a pair of struts, mutually connected with a slidable pin), which interconnects lower and upper parts of a Fork 3 and a Suspension Assembly 4 is attached to it. The other end of said Suspension Assembly 4 is attached to the lower part of the Fork 3. Two Controlling Mechanisms 8.1 are attached to an Adjusting Mechanism 8.4 (one of them attached to a slidable part and the second one to a lock) and are supplemented with a Straining Unit 8.5 (designed as a set of latches with a straining lever).

The embodiments of the bicycle shown on FIGS. 5a and 5b has Regulating Assemblies 8, functioning equally as those in Example 4, attached to a Suspension System on a Fork 3. The advantage of this solution is possibility to easily change character of the front sprung suspension of the bicycle and so to optimize comfort, performance and safety.

Figure 5C:
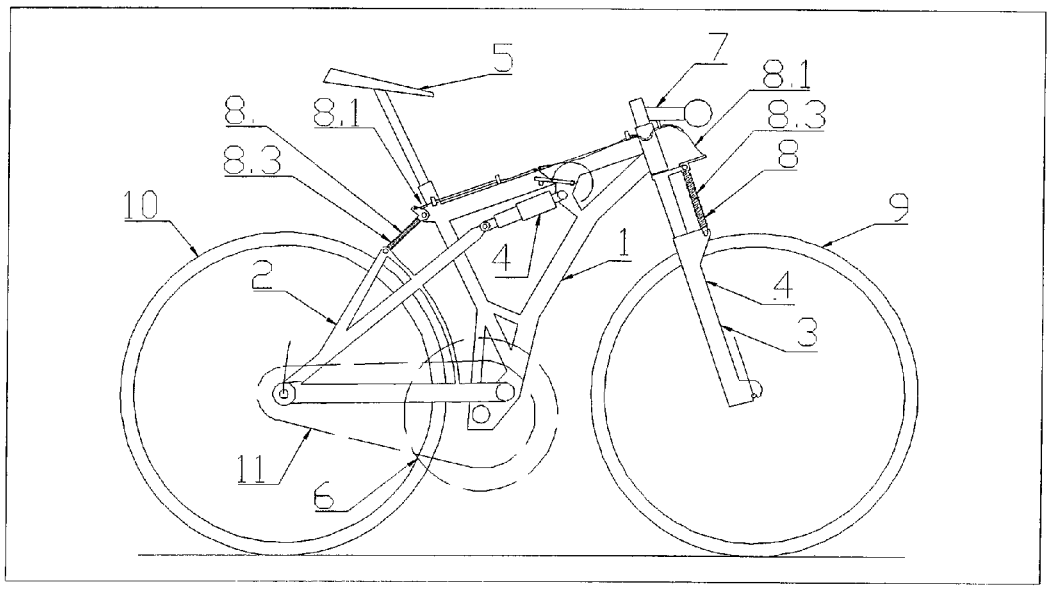

FIG. 5c shows an embodiment of a Regulating Assembly 8 with a Controlling Mechanism 8.1, which are band together (by one conjoint control) with a Controlling Mechanism 8.1 of a Regulating Assembly 8 of a Tail 2. The shown full suspension bicycle has a front and a rear Regulating Assembly 8 with an adjustable Limiting Mechanism 8.3 (designed as a closely coiled straight spring) and with Controlling Mechanisms 8.1, banded together (designed as wire strands with a common control).

The embodiments of the bicycle depicted on the FIG. 5c works as follows: A conjoint control of Controlling Mechanisms 8.1 provides adjustment of the front and the rear suspension simultaneously. The advantage of this solution is in synchronized and easy regulation.

Figure 5D:
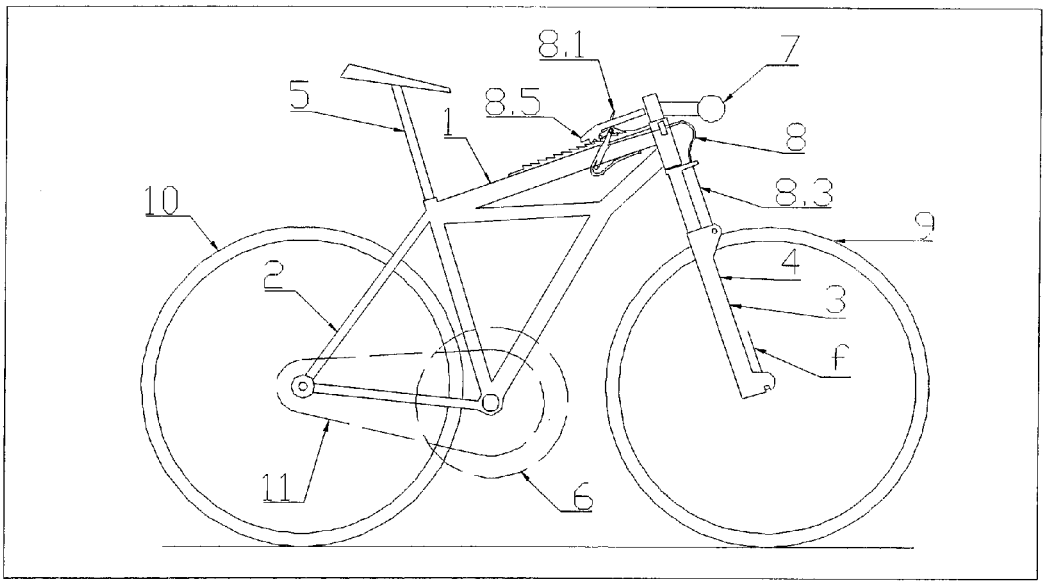
Figure 5E:
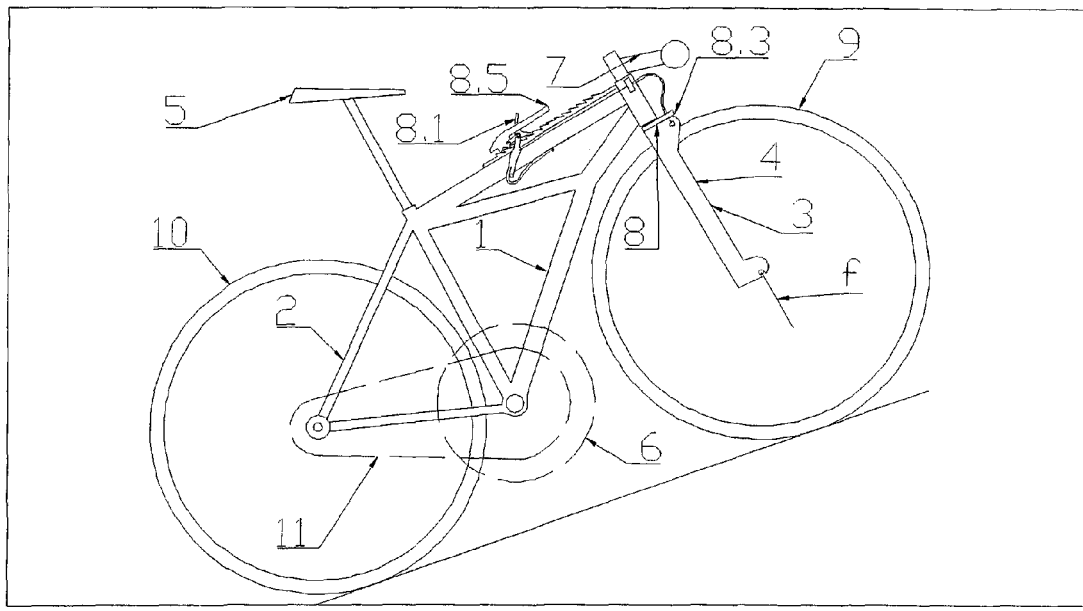

FIGS. 5d and 5e shows embodiments of a Limiting Mechanism 8.3 having large range of contraction (up to the full range of a Fork 3 elevation) and a Controlling Mechanism 8.1 equipped with a Straining Unit 8.5 (designed as equipment for generating and transmitting motion). The both Figs depict the same bicycle; containing a large range Limiting Mechanism 8.3 (designed as a wire strand with a latch lock) to which a Controlling Mechanism 8.1 equipped with a Straining Unit 8.5 (designed as a manual tightening lever), is attached. FIG. 5e shows the bicycle with its Limiting Mechanism 8.3 contracted for uphill ride.

The embodiments of the bicycle depicted on the FIG. 5d works as follows: A Controlling Mechanism 8.1 in its contracted position prevents returning of a telescopic Fork 3 to a relieved position and a Front Wheel 9 keeps its preset elevation, due to what, the front end of the bicycle is downed. The advantage of downed position of Handlebar 7.1 is in diminishing risk of lifting Front Wheel 9 while riding steeply uphill.

Figure 5F:
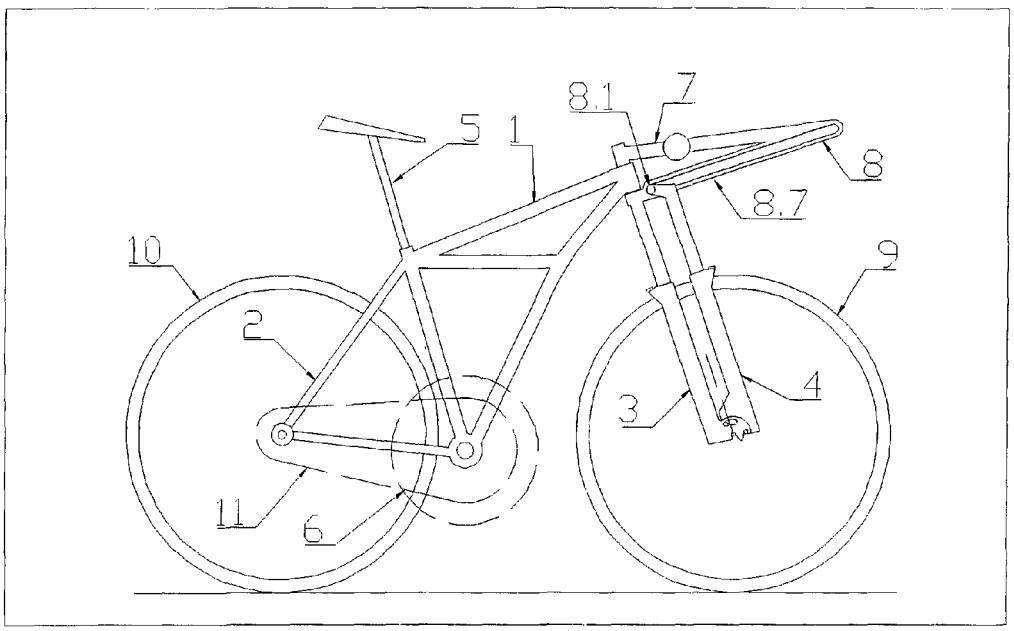

FIGS. 5e and 5f show an embodiment of a Regulating Assembly 8 with its Reducible Joint 8.7, which adjustably (shift-ably) attaches an external Suspension Assembly 4 to one of mutually slidable parts of a Fork 3. Its geometry ensures changing the angle between a Suspension Assembly 4 and a Fork 3, when a Suspension Assembly 4 is being shifted. The shown bicycle has a Reducible Joint 8.7 (designed as a slidable pin in a slot on a bracket with an antisliding lock), which slidably attaches a Controlling Mechanism 8.1 to the upper part of a telescopic Fork 3 and a Suspension Assembly 4 with a pivotally attached lower end to the lower part of a Fork 3.

The bicycle manufactured according to the FIG. 5f works as follows: When position of the upper end of a Suspension Assembly 4 is retreating from a Fork 3, the Fork 3 is being shortened and simultaneously the elevation range and softness of suspension are little by little being diminished till achieving full elimination of suspension with maximally shortened Fork 3, and vice versa for opposing direction. The advantage of this solution is possibility to lower position of the Handlebar 7.1 all the same as with a bicycle depicted on FIGS. 5d and 5e and possibility of fluent regulation of softness and elevation of sprang suspension alike as with that depicted on FIG. 5b.

Example 6

The bicycle shown on FIGS. 6a to 6e comprises at least a rear-suspended Motion System (a Front Wheel 9, Rear Wheel 10, Drivetrain Assembly 11) and a sprung Suspension System (Suspension Assemblies 4), which are the same as in the Example 1 and a Rider-Positioning System (a Seat Assembly 5, Pedal Assembly 6, Handlebar Assembly 7), the assemblies of which are the same as in the Example 1 or 2 or 3 and in some cases has also a Regulating System (Regulating Assemblies 8) equal to that in the Example 4 or 5. The bicycle has a Frame System with a Frame 1 and a Fork 3 which are the same as those in the Example 1. The bicycle is featured with a Tail 2 attached by a Sliding Pin 2.1, whereby a Pedal Assembly 6 is attached movably with respect to a Frame 1, alike as suspended bicycle depicted in Example 1.

Figure 6A:
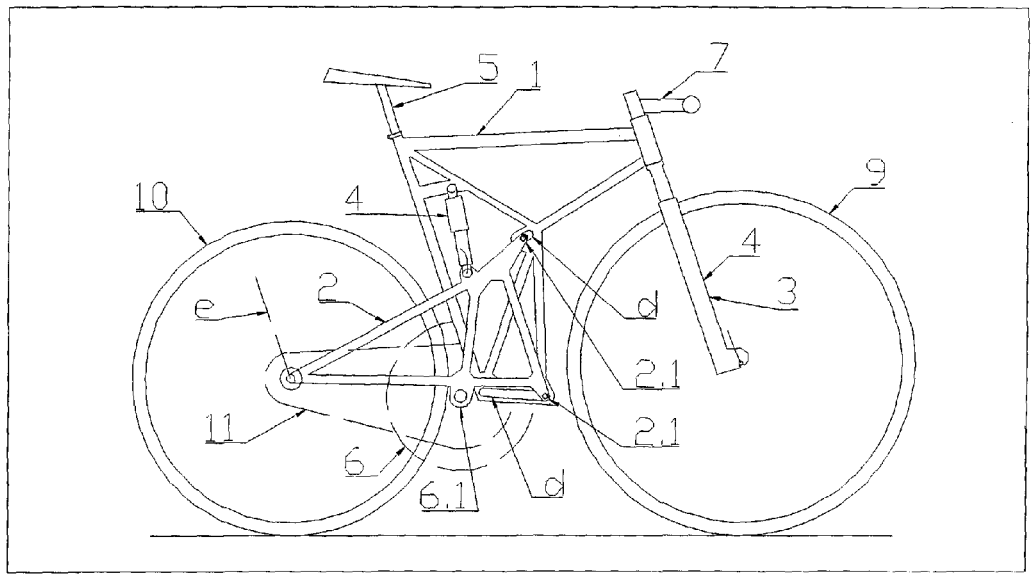
FIGS. 6a to 6e show bicycles with Tails connected to Frames by sliding bolts and with Pedal Assemblies connected movably with respect to Frames.
Figure 6B:
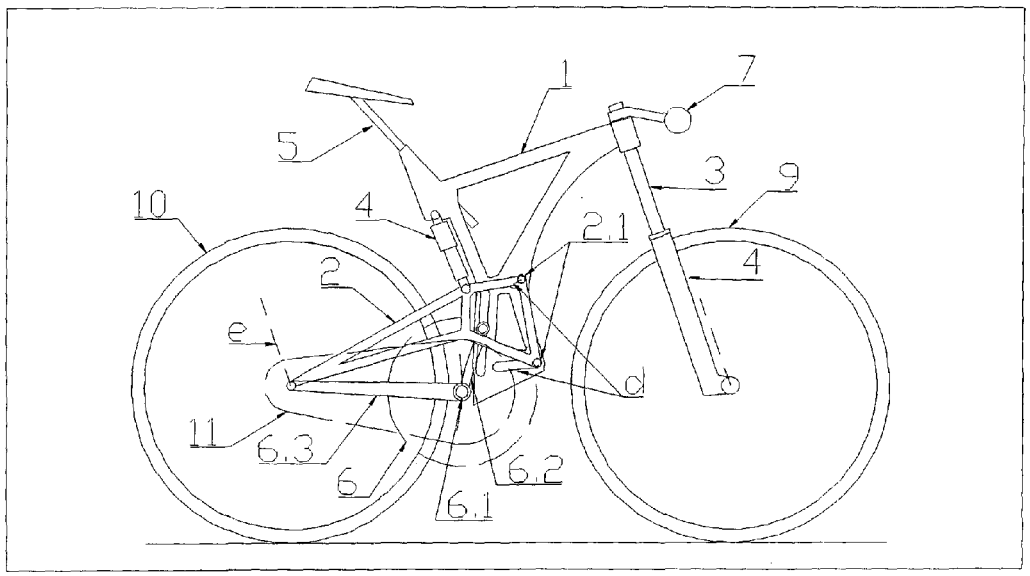

FIGS. 6a and 6b show embodiments of a connection of a Tail 2 by Sliding Pins 2.1, which are, with respect to a Frame 1, slidable along the paths d, shaped in such manner that the elevating path e of a Rear Wheel 10, due to suspension travel, is straight (advantageous solution is that the paths d are straight, convergent and directed to the center of a Rear Wheel 10). The bicycle depicted on FIG. 6a has a Bottom Bracket 6.1 attached onto a Tail 2 and has a large-diameter Front Wheel 9 on a suspended Fork 3. The bicycle depicted on FIG. 6b has a Bottom Bracket 6.1 attached by a Support Unit 6.2 and a Distancing Unit 6.3.

Figure 6C:
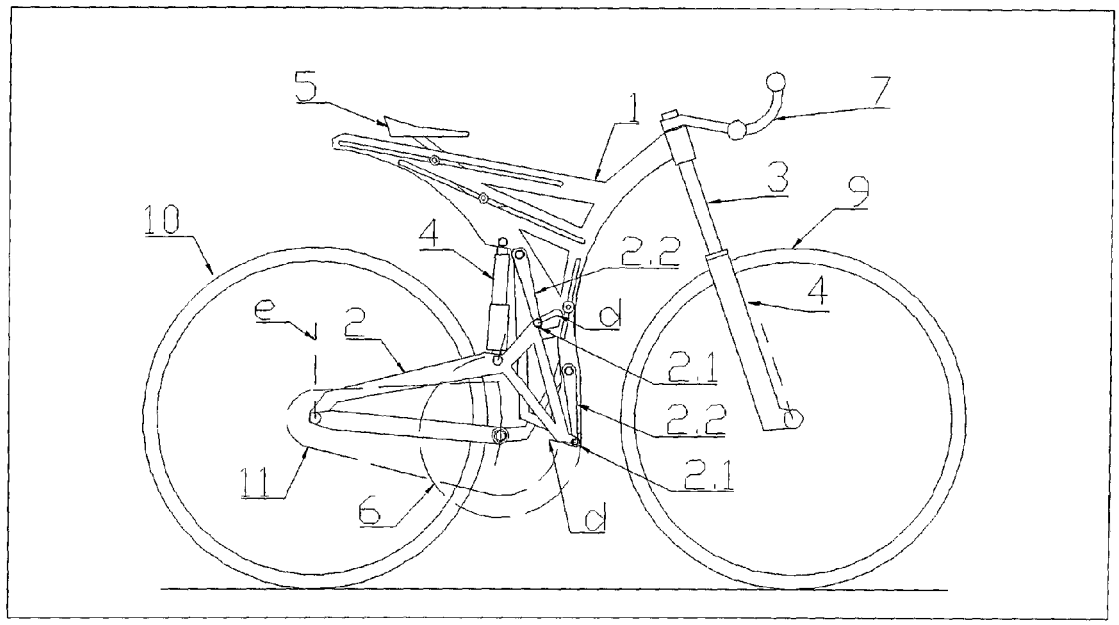

FIG. 6c presents an embodiment of a connection of a Tail 2 by Pins 2.1, which are attached to a Frame 1 by Connecting Unit 2.2 (designed as for example a swing bar or a system with variable geometry). The depicted bicycle has two Pins 2.1 attached by swinging Connecting Units 2.2 (designed as a pair of lateral swing bars, which are, at the both top and bottom ends, connected with their common axle and on the both sides are braced equally as a Lateral Support in Example 1). The slots for paths d are bow-shaped and their length responses to the range of motion of a Connecting Unit 2.2.

Figure 6D:
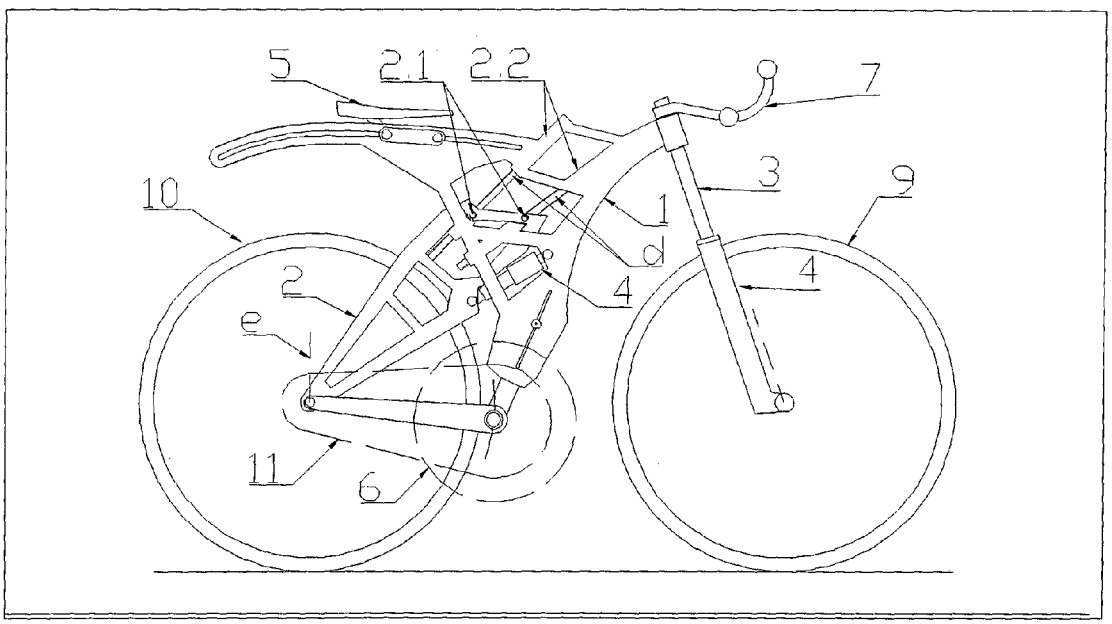
Figure 6E:
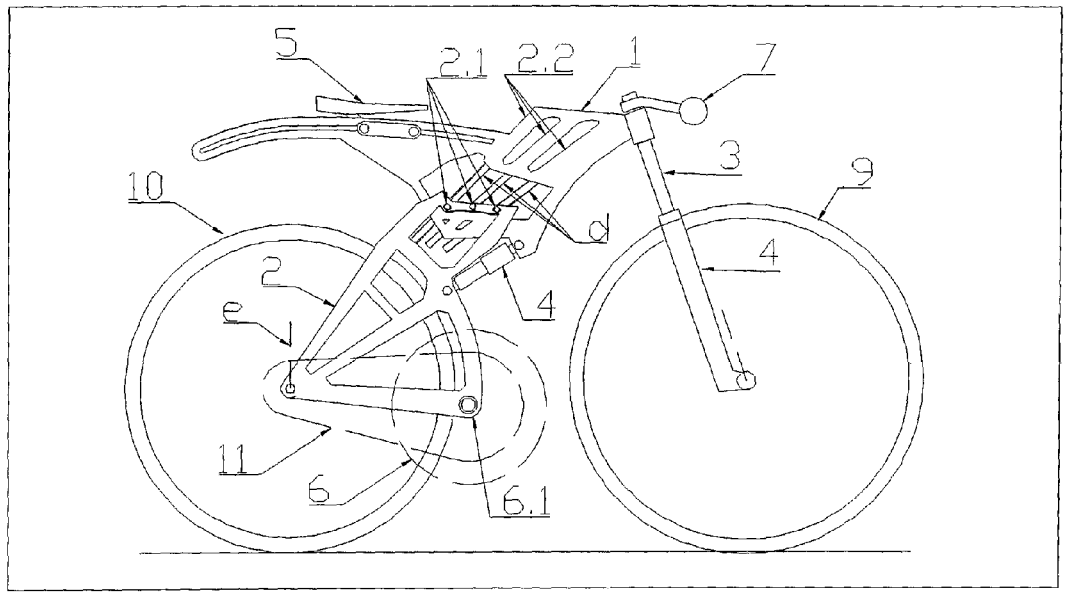

FIGS. 6d and 6e present the embodiment of attachment of a Tail 2 with Pins 2.1, which are connected to a Frame 1 by a plug-in Connecting Unit 2.2 (designed as for example a plug-in bracket or a piston). The bicycle depicted on FIG. 6d has two Pins 2.1, connected to a Frame 1 by a plug-in Connecting Unit 2.2 (designed as a piston with its both ends plugged into guiding cylinders), and a Pedal Assembly 6 attached to a Frame 1. The bicycle depicted on FIG. 6e has three Pins 2.1 (designed equally) and a Pedal Assembly 6 attached to a Tail 2, what ensures sufficient place for using a large-diameter Front Wheel 9.

The embodiments of the bicycle depicted on the FIGS. 6a to 6e works as that in Example 1. Using Sliding Pins 2.1 for connecting a Tail 2 enables high elevation of a Front Wheel 9 along the path e, having suitable shape and slope. The backwardly inclined straight path e is especially advantageous because its shock absorbing direction is identical with the direction of impacts to a Front Wheel 9. Another advantage of such connecting of a Tail 2 provides sufficient place even for Front Wheels 9, having larger diameters, nevertheless with keeping sufficient range of elevation and a short wheelbase. It enables comfortable ride and good manoeuvrability even in cragged grounds.

Example 7

The bicycle comprises a Frame System (a Frame 1, Tail 2, Fork 1), a Motion System (a Front Wheel 9, Rear Wheel 10, Drivetrain Assembly 11) and in some cases also a Suspension System (Suspension Assemblies 4) which are equal to those in Example 1. In some cases there is also a Regulating System (; Regulating Assemblies 8) which is equal to that in Example 4 or 5. The bicycle has a Rider-Positioning System (a Seat Assembly 5, Pedal Assembly 6, Handlebar Assembly 7), equal to that in Example 2, where the Seat 5.1 is attached to the Seat Post 5.2 movably inserted into the Seat Carrier 5.3. The bicycle is featured with a movable Seat Assembly 5, designed in such manner that, even in its rear position, disables its interference into the area occupied by Rear Wheel 10.

Figure 7A:
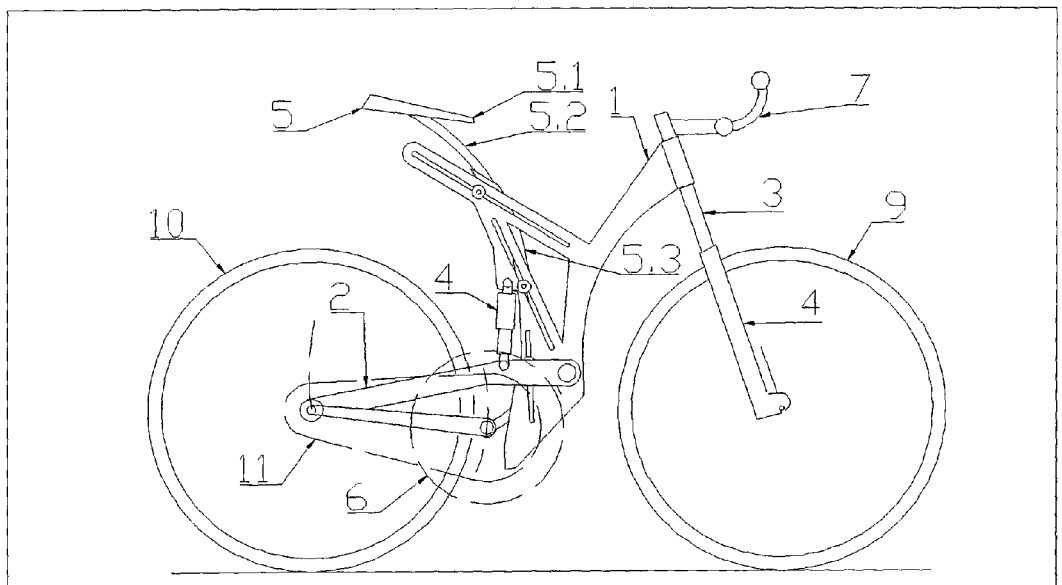
FIGS. 7a to 7b show bicycles with Seat Assemblies, which have geometrical arrangement non-interfering into elevation area of a Rear Wheel.

FIG. 7a presents an embodiment of a Seat Assembly 5, going around the Rear Wheel 10 position even when its elevation is maximal. Depicted bicycle has a bow shaped Seat Post 5.2 inserted to a bow shaped Seat Carrier 5.3, circumventing the Rear Wheel 10 in its top position.

Figure 7B:
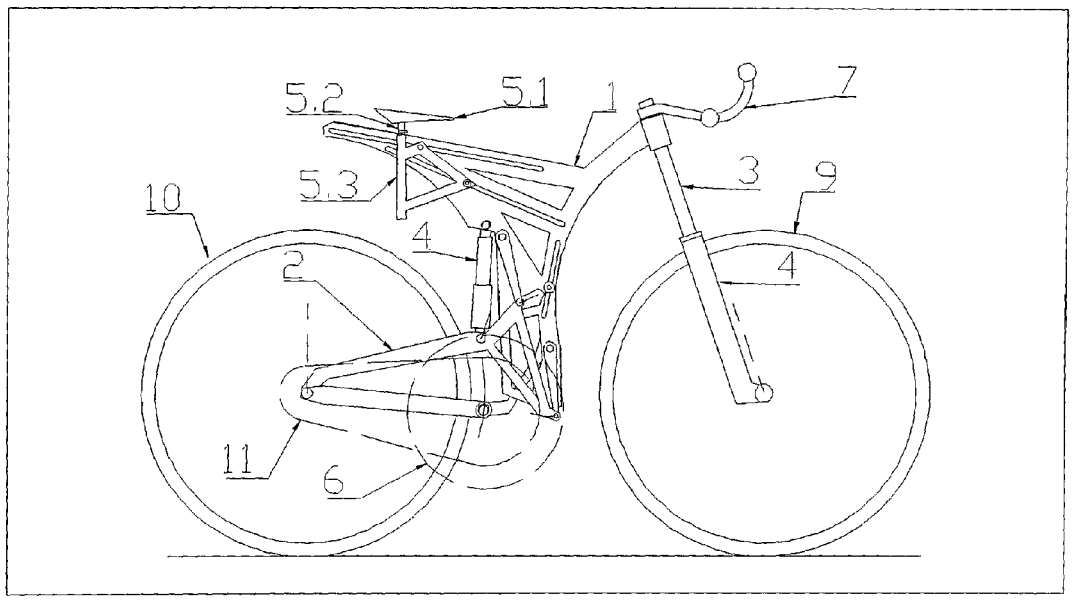

FIG. 7b presents an embodiment of a Seat Assembly 5, which is shaped to lateral by-passing of the Rear Wheel 10. Depicted bicycle has a pair of Seat Posts 5.2, inserted to a pair of Seat Carriers 5.3, placed on the both sides of the Frame 1.

The embodiments of the bicycle depicted on the FIGS. 7a to 7b works equally as that in Example 2, where a Seat 5.1 is vertically adjustable using current way. The advantage of this solution is that its geometrical arrangement enables high elevation travel of a Tail 2.

Example 8

The bicycle depicted on FIGS. 8a to 8d comprises a Frame System (a Frame 1, Tail 2, Fork 3) a Motion System (a Front Wheel 9, Rear Wheel 10, Drivetrain Assembly 11) and in some cases also a Suspension System (Suspension Assemblies 4) which are equal to those in Example 1 or 6. In some cases there is also a Regulating System (Regulating Assemblies 8) which is equal to that in Example 4 or 5 and a Rider-Positioning System (a Seat Assembly 5, Pedal Assembly 6, Handlebar Assembly 2), equal to that in Example 1 or 2 or 3 or 7. The bicycle is featured with a Transforming System, at least one Shifting Assembly 12 attached to a movable assembly of a Rider-Positioning System (a Seat Assembly 5, Pedal Assembly 6, Handlebar Assembly 2). A Shifting Assembly 12 (designed as equipment for generating and transmitting motion) is, in some cases, moreover connected to locks or to controls of locks of the attached assemblies (a Seat Assembly 5, Pedal Assembly 6, Handlebar Assembly D.

Figure 8A:
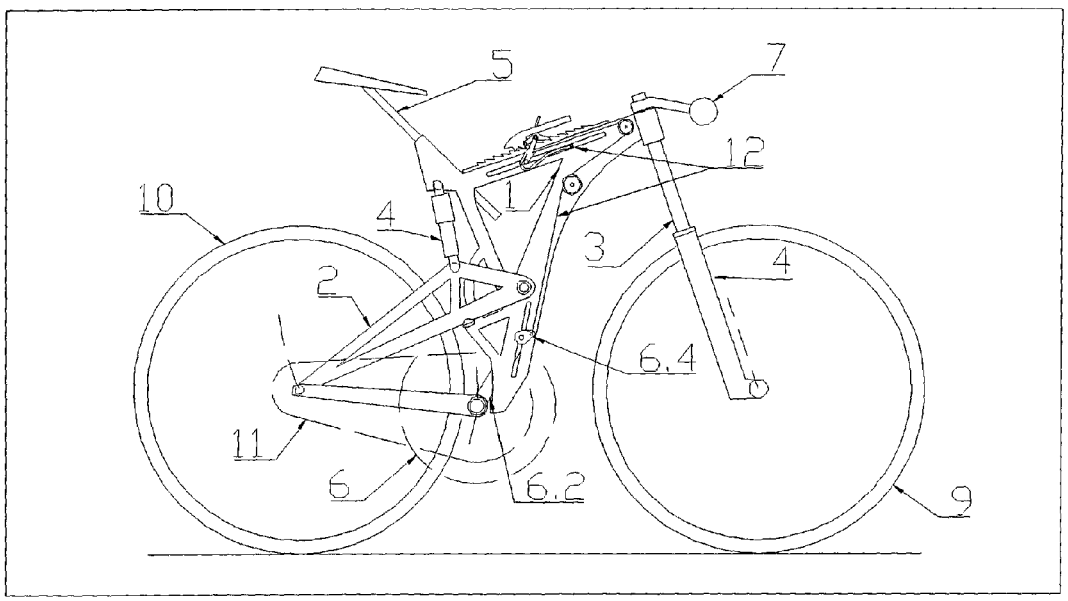
FIGS. 8a to 8d show bicycles with Transforming Systems containing at least one sliding assembly, which is connected to movable assembly of a Rider-Positioning System.
Figure 8B:
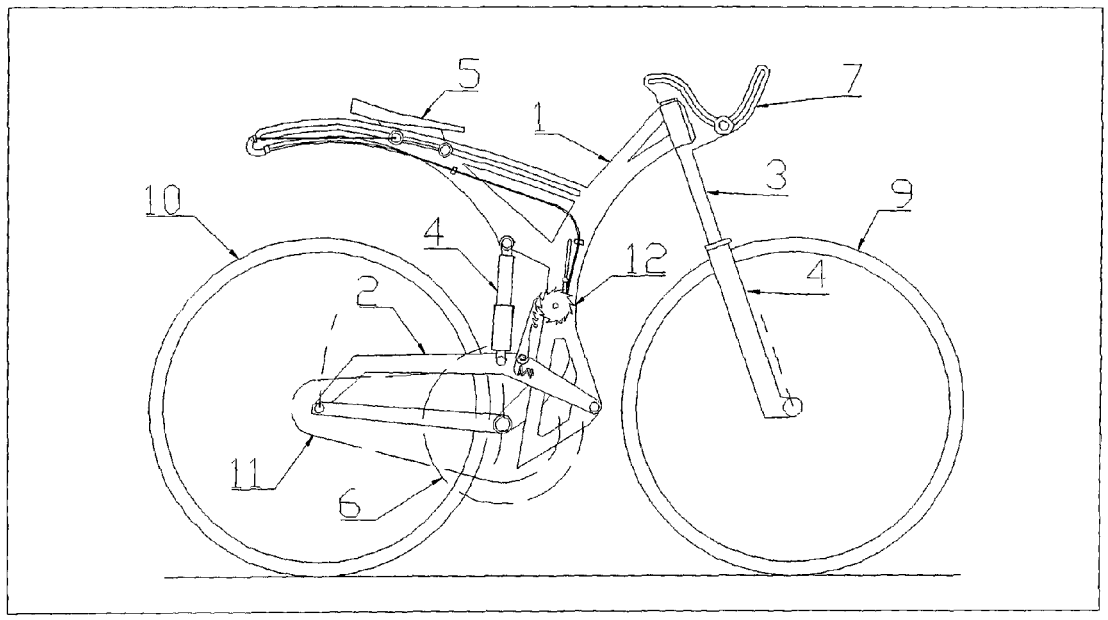
Figure 8C:
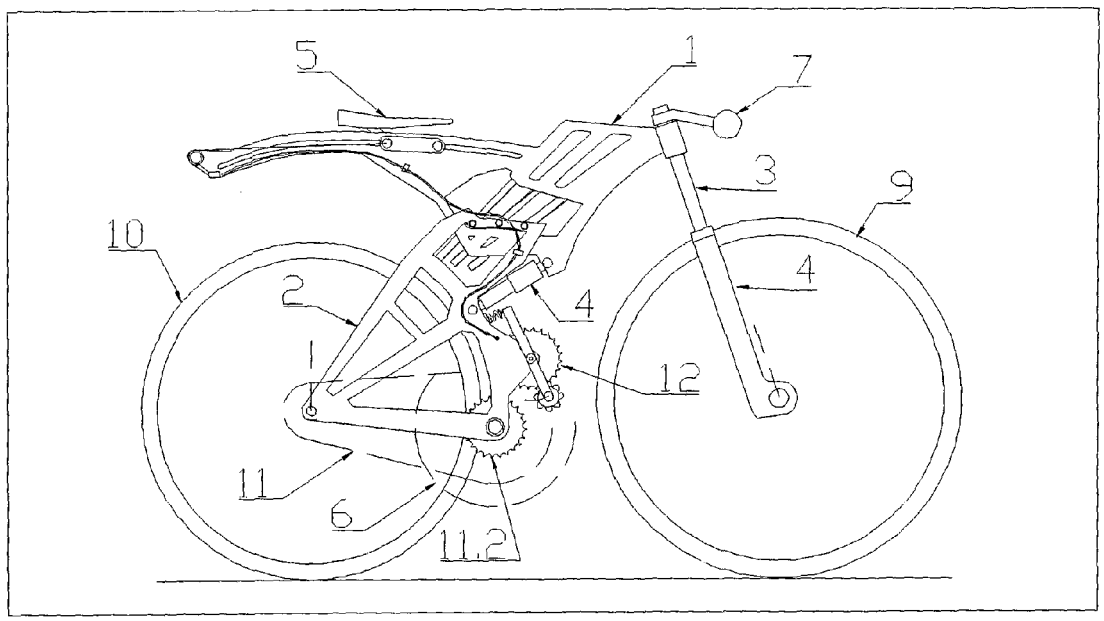

FIGS. 8a to 8c show embodiments of a Shifting Assembly 12 for transferring motion, performed by rider.

FIG. 8a presents an embodiment of a Shifting Assembly 12 (designed as for example current winches, lifters, tighteners, lever mechanisms) driven by rider's interventions, performed either manually or by movements of his or her body. The depicted bicycle has a Shifting Assembly 12 (designed equally as the Controlling Mechanisms of the Regulating Assembly in FIG. 5d) which is attached to a vertically adjustable Pedal Assembly 6, advantageously to its Pedal Lock 6.4 (in the place where it effects in the opposite direction against the reversing element of the Pedal Lock 6.4).

FIG. 8b presents an embodiment of a Shifting Assembly 12 driven by swinging movements of Tail 2 (designed as a current assembly for transforming the swinging movement to a single-directional movement). The depicted bicycle has a movable Seat Assembly 5, attached to severable Shifting Assembly 12 (designed as a system comprising a cable winch with a gear wheel and tilt-able latched arm), which is attached to a Frame 1 and a Tail 2.

FIG. 8c presents an embodiment of a Shifting Assembly 12 (designed as a gearing system for translating rotation into linear motion) driven by rotation of some parts of a Motion System (comprising a Front Wheel 9, Rear Wheel 10, Drivetrain Assembly 11). The bicycle shows on FIGS. 8a to 8c has a movable Seat Assembly 5, attached to a Shifting Assembly 12 (designed as a system comprising a cable winch with a gear wheel and a tilt-able arm, equipped with another gear which is interlock-able into the previous one and in one its position also into the rotatable part of a Motion System), which is attachable to a Drivetrain Assembly 11 (to its smallest gear, which is normally used for uphill drive).

The embodiments of the bicycle depicted on FIGS. 8a to 8c works as follows: The rider unlocks a slidable assembly of a Rider-Positioning System (not depicted in FIGS. 8a to 8c) and, by means of a Shifting Assembly 12 using either manual tightening or pedalling or intentional wobbling on rear suspension, sets it up to achieve the desired position. There, the said assembly is locked and also the Shifting Assembly 12 is switched off or cut off. The advantage is that the active operations necessary for setting said Rider-Positioning System to downhill position are done in situation demanding little propulsion energy. For returning to uphill position either simple pushing to a Pedal Assembly 6 and/or tightening rider's body toward a Handlebar Assembly 7 is sufficient.

Figure 8D:
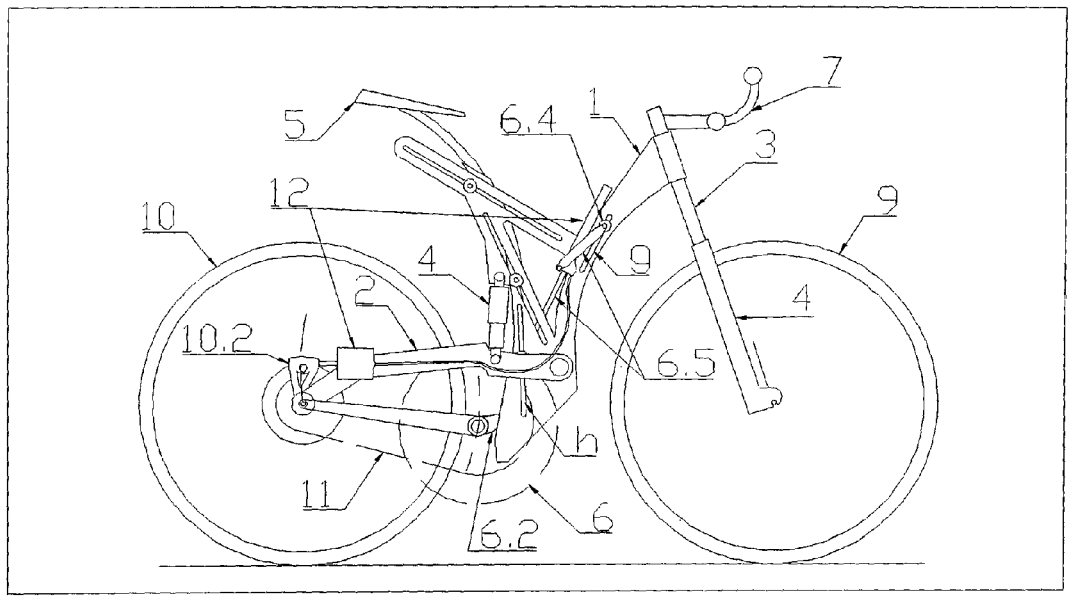

The FIG. 8d presents an embodiment of a Shifting Assembly 12 driven by breaking power or by some external source of power (designed as for example electromotor, hydraulic pump, recuperator of breaking energy equipped with a manual or automatic switch). The depicted bicycle has a disc Rear Brake 10.2 attached to a Tail 2 slidably along the arch which is concentric with a Rear Wheel 10. Said bicycle has also a Support Unit 6.2 slidable along the path g on a Frame 1, attached by a telescopic Sliding Unit 6.5 (designed as an equipment comprising a telescopic component) which is slidable along the path h on the Frame 1 and lockable by a Pedal Lock 6.4). The Shifting Assembly 12 (designed as a hydraulic system with a short and thick Input Hydraulic Cylinder and a long and thin Output Hydraulic Cylinder, which are connected with a delivery hose and supplemented with input and output locks) connects a slidable Rear Brake 10.2 with a Tail 2 on one end, and the slidable parts of a telescopic Sliding Unit 6.5, on the other end, The embodiments of the bicycle of FIG. 8d works as follows: The Shifting Assembly 12 is activated to shift the just unlocked assembly, either manually or automatically. Automatic shifting is provided by either its own power or by power, taken from Motion System. In case of employing energy of braking, a slidable Rear Brake 10.2 is forced to move in direction of rotating of a Rear Wheel 10, after gripping brake shoe. The motion of the brake, within the range of its freedom, is transferred to the Shifting Assembly 12. An Input Lock allows switching off the automatic shifting at the start of braking. An Output Lock allows switching off the automatic return at the end of braking. The advantage of this solution is that the rider can rearrange a Rider-Positioning System without larger effort. Utilization of braking energy enables frequent and comfortable readjusting of the Rider-Positioning System for limited period of braking time.

Example 9

The bicycle depicted on FIGS. 9a to 9d comprises a Frame System (a Frame 1, Tail 2, Fork 3), a Motion System (a Front Wheel 9, Rear Wheel 10, Drivetrain Assembly 11) and in some cases also a Suspension System (Suspension Assemblies 4), which are equal as those in Example 1 or 6 and in some cases also a Regulating System (Regulating Assemblies 8) which is equal as that in Example 4 or 5. The bicycle has a Rider-Positioning System (a Seat Assembly 5, Pedal Assembly 6, Handlebar Assembly 7), assemblies of which are equal as those in Example 1 or 2 or 3 or 7 and in some cases a Transforming System (Shifting Assemblies 12) equal as that in Example 8. The bicycle is featured with a Transforming System comprising one or more Synchronizing Assemblies 13, connecting movable assemblies of a Rider-Positioning System to each other. The Synchronizing Assembly 13 (designed as an assembly for transferring motion) has in some cases also another connection to Locks or to Lock Controls of the connected assemblies (a Seat Assembly 5, Pedal Assembly 6, Handlebar Assembly 7).

Figure 9A:
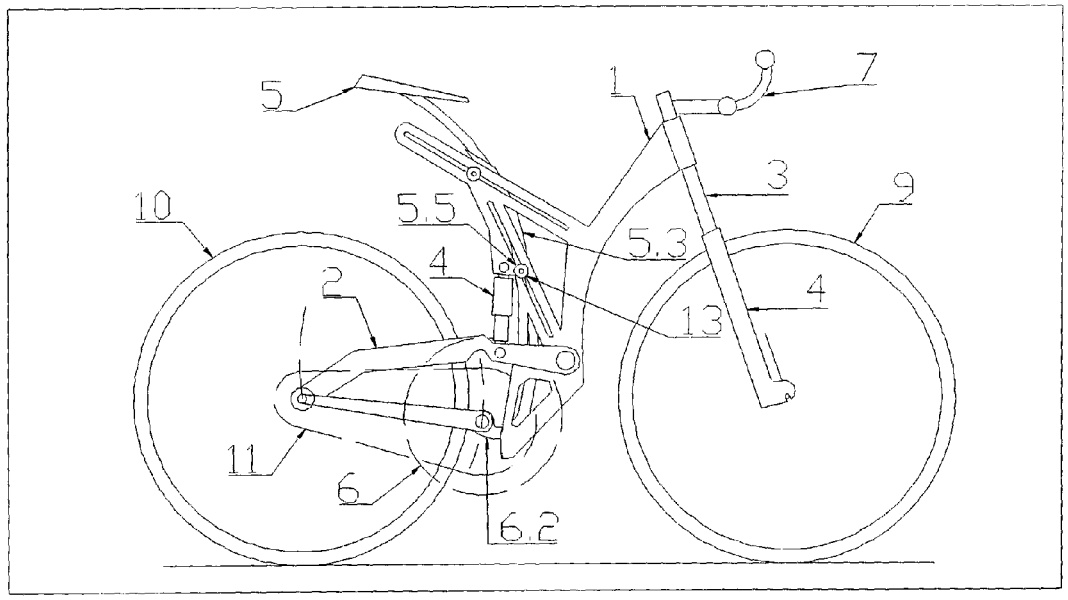
FIGS. 9a to 9d show bicycles with Transforming Systems, containing one or more synchronizing assemblies, which mutually connect movable assemblies of Rider-Positioning System.
Figure 9B:
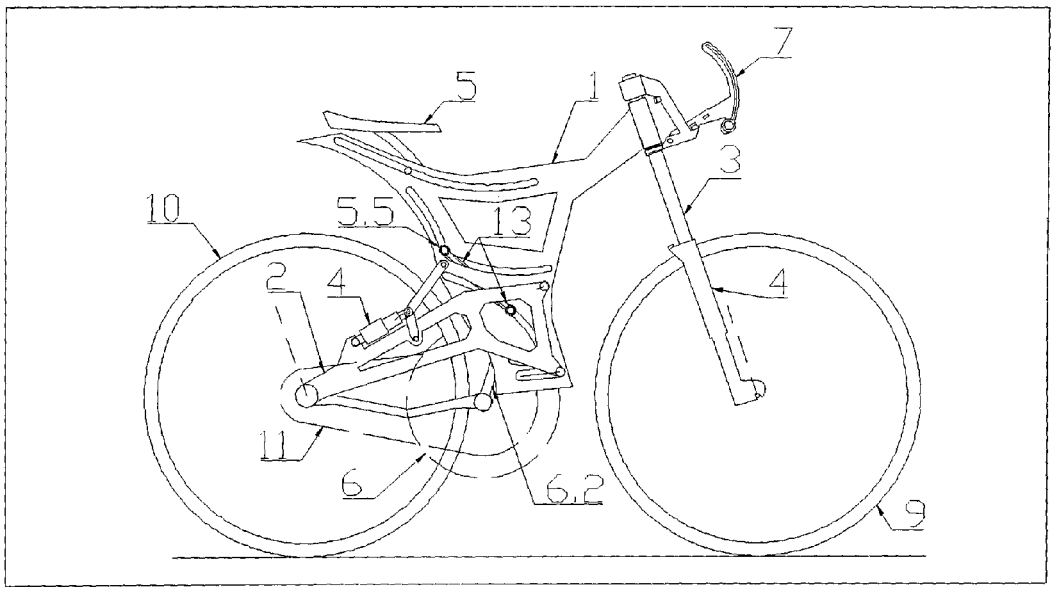

FIGS. 9a to 9b present embodiments of a Synchronizing Assembly 13, transferring both tensile and pressure forces (designed for example as a pivot, a swing bar), which connects assemblies of a Rider-Positioning System to the unified system with variable geometry. The bicycle depicted in FIG. 9a has a one-pivoted Tail 2 and a Synchronizing Assembly 13 (designed as a pivot), connecting a Bottom Connector 5.5 with a Support Unit 6.2. The Pedal Assembly 6 may not have its own Pedal Lock 6.4). The mentioned example may also be interpreted as a direct attachment of a Support Unit 6.2 to a Seat Assembly 5.

The bicycle depicted in FIG. 9b has a two-pivoted Tail 2 and a Synchronizing Assembly 13 (designed as a swing bar), connecting a Bottom Connector 5.5 with a Support Unit 6.2.

Figure 9C:
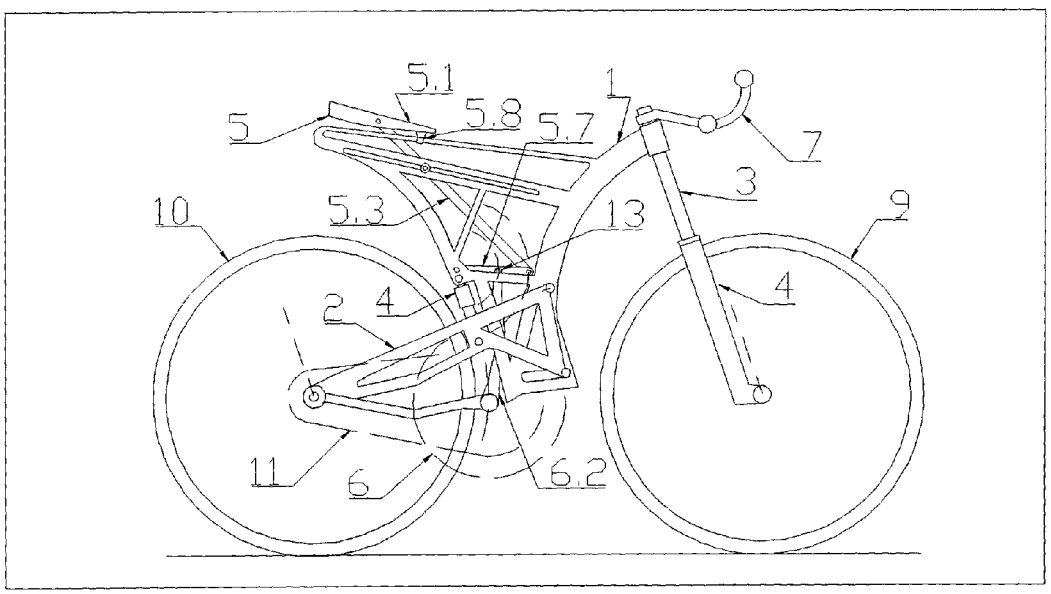

The bicycle depicted in FIG. 9c has a two-pivoted Tail 2 and a Synchronizing Assembly 13 (designed as a pivot), connecting a Swing Bar 5.7 with a Support Unit 6.2. A Seat 5.1 is attached to a Seat Carrier 5.3 by a pivot and to a Frame 1 by a slidable Distancing Unit 6.3.

Figure 9D:
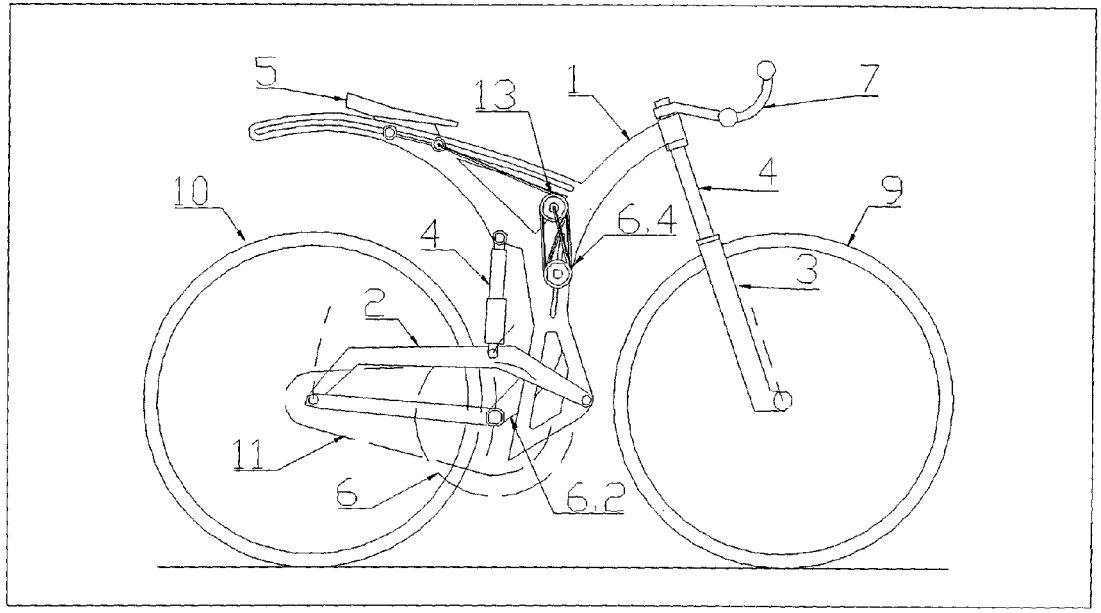

FIG. 9d presents an embodiment of a Synchronizing Assembly 13 transferring only the tensile forces (designed for example as a wire strand, a pulley block, in some cases a pair of such elements for sliding in both opposite directions). The depicted bicycle has a one-pivoted Tail 2 and a Synchronizing Assembly 13 (designed as a pulley block with a wire strand).

The embodiments of the bicycle depicted on FIGS. 9a to 9d works alike that in Example 2 with a difference that in the unlocked state, the shift travels of both a Seat Assembly 5 and a Pedal Assembly 6 are bound in the range and the proportions given by a Synchronizing Assembly 13. Advantageous solution is that, when shifting said Seat Assembly 5 rearward, in its active range, the Pedal Assembly 6 is lifted, in required ratio of transmission and vice versa when pushing the Pedal. Assembly 6 downwardly, the Seat Assembly 5 is shifted frontwardly (not depicted in FIG. 9d). The advantage of this solution is in more comfortable synchronized adjusting of a Rider-Positioning System and in achieving automatic concordance of the position of a Seat 5.1 with the position of a Bottom Bracket 6.1.

Example 10

The bicycle depicted on FIGS. 10a to 10j comprises a Frame System (a Frame 1, Tail 2, Fork 3), a Motion System (a Front Wheel 9, Rear Wheel 10, Drivetrain Assembly 11) and a Suspension System (Suspension Assemblies 4), which are equal as those in Example 1 or 6, and a Regulating System (Regulating Assemblies 8, in some cases also a Regulating Unit 4.1 of a Suspension Assembly 4) which is equal as that in Example 4 or 5, or equal as a Regulating Unit 4.1 of adjustable Suspension Assemblies 4. The bicycle has a Rider-Positioning System (a Seat Assembly 5, Pedal Assembly 6, Handlebar Assembly 7), the assemblies of which are equal as those in Example 1 or 2 or 3 or 7 and in some cases a Transforming System (a Synchronizing Assembly 13, Shifting Assembly 12) equal as that in Example 8 or 9. The bicycle is featured with a Transforming System containing a Self-Controlling Assembly 14 (designed as an equipment for bi-directional transfer of motion) attached either to a Controlling Mechanism 8.1 of a Regulating Assembly 8, or to a Regulating Unit 4.1 of a Suspension Assembly 4.

FIGS. 10a to 10d present embodiments of a Self-Controlling Assembly 14, attached to a Rider-Positioning System as a source of its motion.

Figure 10A:
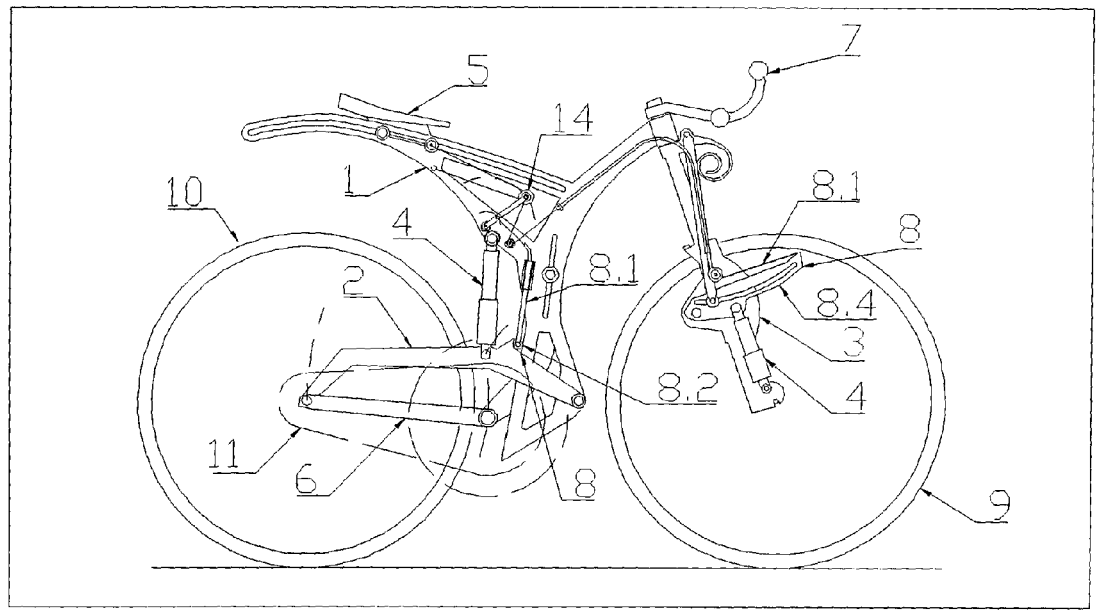
FIGS. 10a to 10j show bicycles with Transforming Systems, containing Self-Controlling Assembly, connected to the Controlling Mechanism of a Regulating Assembly or to the regulating unit of a Suspension Assembly.

FIG. 10a presents an embodiment of a Self-Controlling Assembly 14 (designed alike the Synchronizing Assembly in Example 9), which is regulatable by its movable assembly travel. The depicted bicycle has two Regulating Assemblies 8. The rear one has a Locking Mechanism 8.2 and the front one has an Adjusting Mechanism 8.4. The Self-Controlling Assembly 14 (designed as a lever, equipped with a pulley, carrying a connecting wire strand) is attached to a Frame 1 and to a slidable Seat Assembly 5. A front and a rear Controlling Mechanism 8.1 (designed as wire strands and in some cases also their back pulling elements) are attached to the Self-Controlling Assembly 14. The Regulating Assemblies 8 and the Seat Assembly 5 can have their locks coupled (the locks or their controls banded together).

Figure 10B:
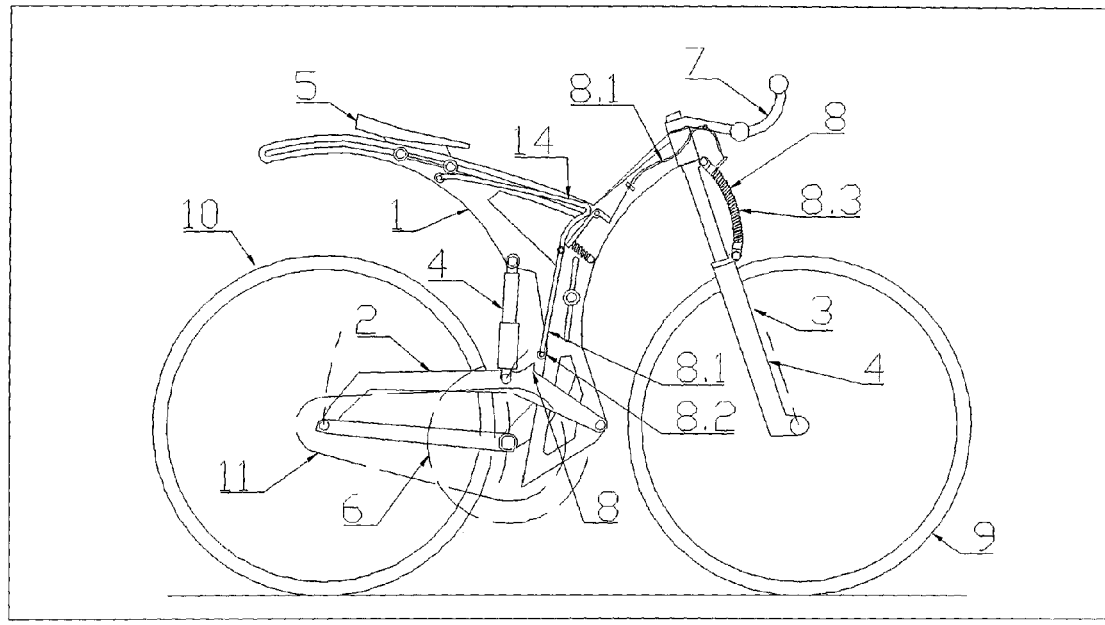

FIG. 10b presents an embodiment of a Self-Controlling Assembly 14 (designed as a reversing switch or a gearing mechanism, which can be pushed away) switch-able by passing of a Rider-Positioning System assembly. The depicted bicycle differs from the previous one by having a Limiting Mechanism 8.3 frontally located and by having its Self-Controlling Assembly 14 (designed as a flexible lever), which interferes into no more room, than into the area occupied by a Seat Assembly 5 only when being in the frontal position of its travel.

Figure 10C:
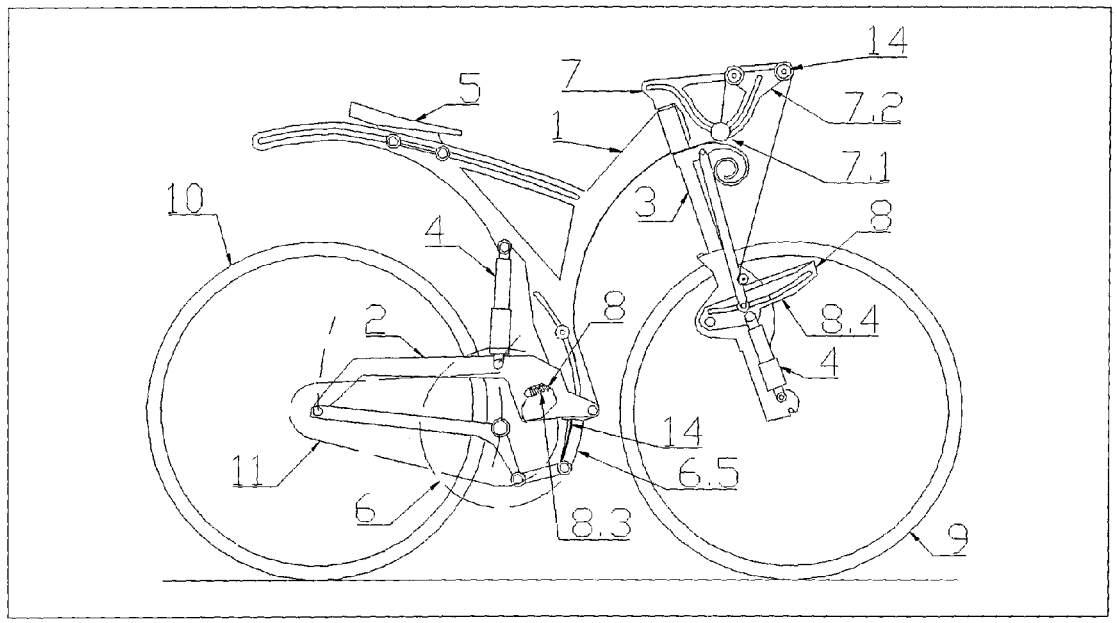

FIG. 10c presents an embodiment of a bicycle equipped with two Self-Controlling Assemblies 14. The depicted bicycle has two Regulating Assemblies 8: the rear one with a Limiting Mechanism 8.3 and the front one with an Adjusting Mechanism 8.4. The front Self-Controlling Assembly 14 (designed as a wire strand and guiding elements) is attached to a relocatable Handlebar 7.1 and is guided along a Handlebar Carrier 7.2. There is also a rear Self-Controlling Assembly 14 (designed as a thrust element, broadening upwardly), which is located on a Sliding Unit 6.5 of a Pedal Assembly 6 and is propped up to the Limiting Mechanism 8.3 (to its springing part).

Figure 10D:
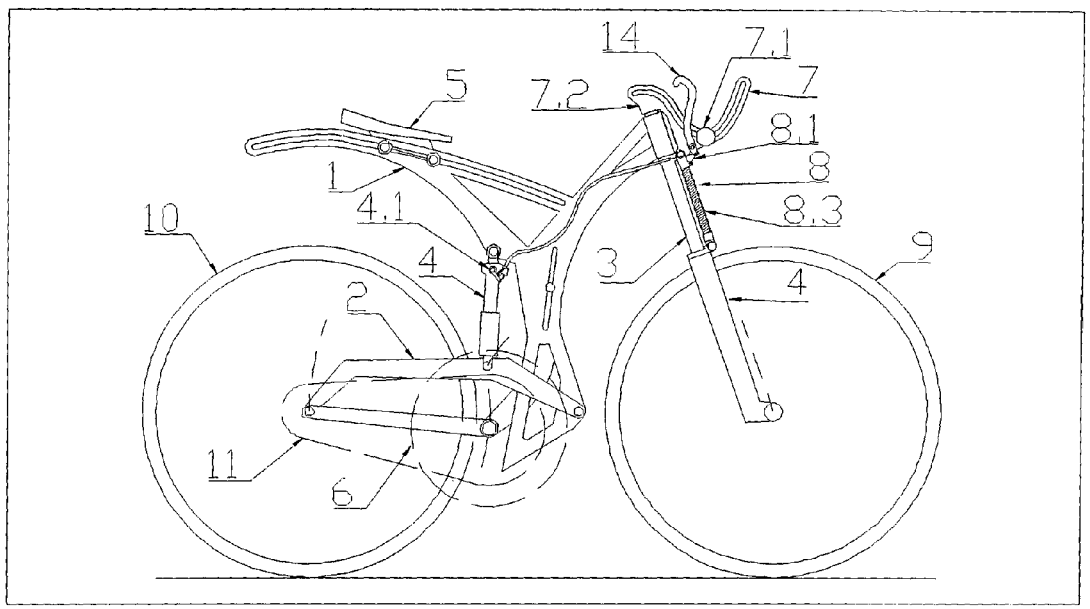

FIG. 10d presents an embodiment of a Self-Controlling Assembly 14 attached to a Regulating Unit 4.1 of a Suspension Assembly 4. The depicted bicycle has a front Regulating Assembly 8 with a Limiting Mechanism 8.3 and a rear Suspension Assembly 4, equipped with a Regulating Unit 4.1 (designed as an internal functioning arrangement and an external controlling lever).

A Self-Controlling Assembly 14 (designed as a sprung lever, a wire strand and a reversing element) is attached to a Handlebar Carrier 7.2 in such way that (with its springing part) is extended to the room, which is occupied by the Handlebar 7.1 only when travelled to its rear position. The Self-Controlling Assembly 14 is attached to a Regulating Unit 4.1 (by means of its wire strand and reversing element). A Controlling Mechanism 8.1 of the front Regulating Assembly 8 is also attached to the Self-Controlling Assembly 14.

The embodiments of the bicycle depicted on FIGS. 10a to 10d works as follows: Any motions of its Rider-Positioning System assemblies are transferred, by a Self-Controlling Assembly 14, to Controlling Mechanisms 8.1 of a Regulating System or to Regulating Units 4.1 of a Suspension System. It enables locking-off the Suspension System or to change its softness. Depending on the design of given Self-Controlling Assembly 14, a Controlling Mechanism 8.1 is switch-able only in some travel positions or in some sliding sections or in some travel positions of the source assembly of a Rider-Positioning System.

Said motion can be geared to provide various gear ratios. An advantage of this solution is that the Suspension System is automatically alterable to softness typically required by trail slope or by adjustment of a Rider-Positioning System.

Figure 10E:
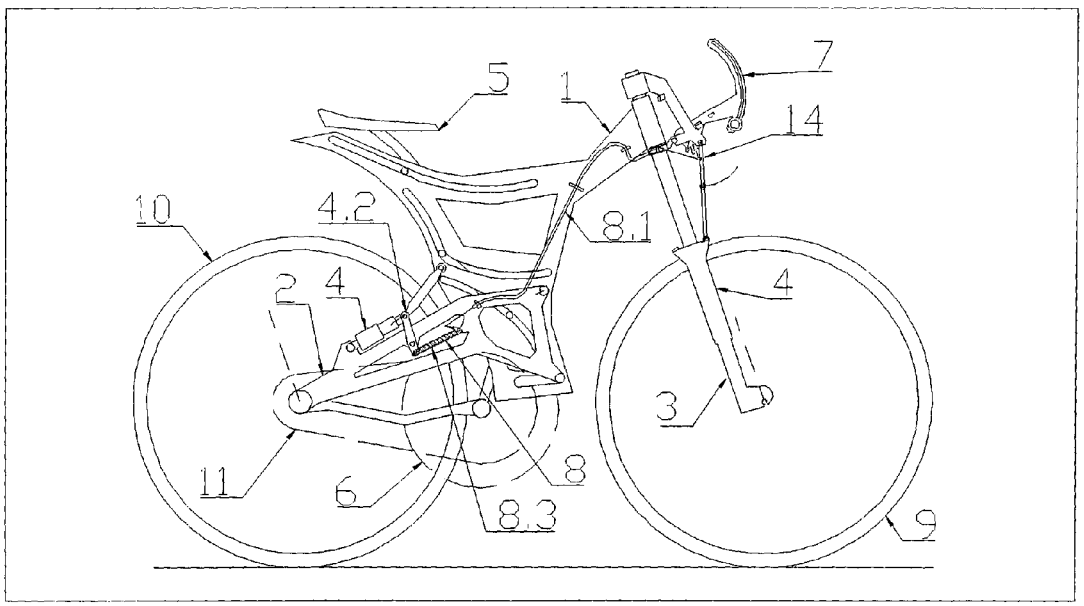

FIG. 10e presents an embodiment of a Self-Controlling Assembly 14 which is controlled by the compression of a sprung Fork 3. The depicted bicycle has a Suspension Assembly 4 attached to a Tail 2 and via Linkage Arrangement 4.2 (designed as a pair of swing bars) attached to a Frame 1 and to a Tail 2. Move-ability of said connection of the Linkage Arrangement 4.2 with respect to a Tail 2 is lockable by a Regulating Assembly 8. The Regulating Assembly 8 has a Limiting Mechanism 8.3 (designed as a close-coiled spring) which connects a Tail 2 with a Locking Mechanism 4.2. A Self-Controlling Assembly 14 (designed as a two bar linkage) connects a telescopic Fork 3 (its bottom part) with a Handlebar Assembly 7 as well as a Controlling Mechanism 8.1 (designed as a wire strand and its reversing element and in some cases also as a mechanical or hydraulic unit for delaying or retardation of return speed of the wire strand) of the Regulating Assembly 8.

The bicycle designed according to the FIG. 10e works as follows: In response of elevation of the suspended Front Wheel 9, the front Self-Controlling Assembly 14 temporarily unlocks the rear Regulating Assembly 8. The advantage of this solution is in automatic unlocking of a Rear Suspension when the Front Wheel is going through a ground ruggedness i.e. just before the spot, where the rear shock absorbing would be probably very desirable.

Figure 10F:
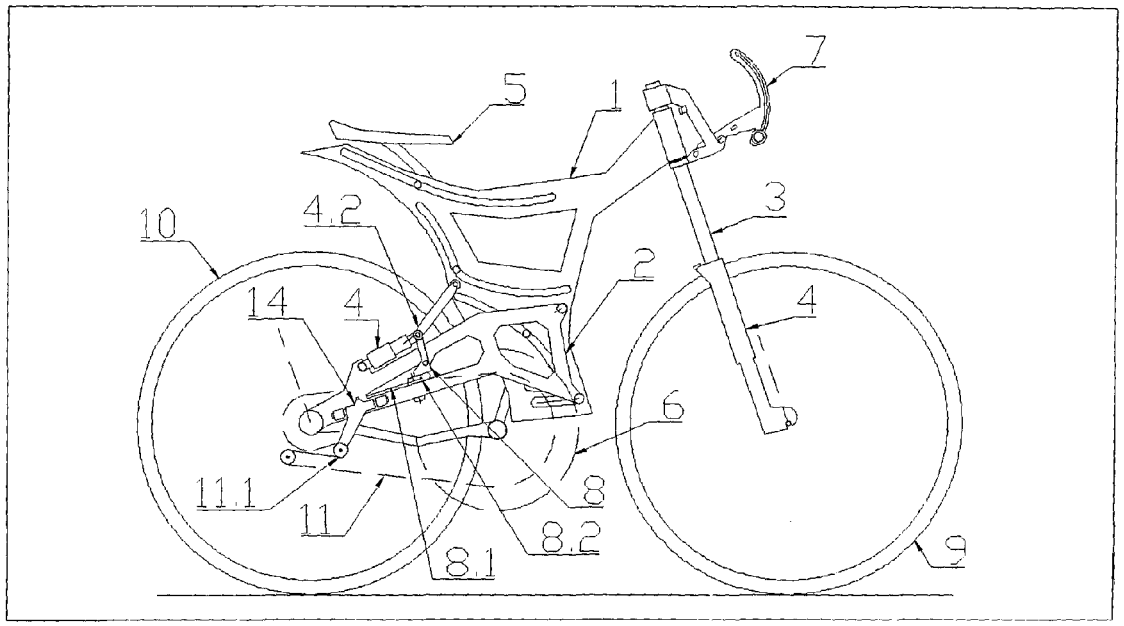

FIG. 10f presents an embodiment of a Self-Controlling Assembly 14, controlled by changing gear ratio in a Drivetrain Assembly 11. The depicted bicycle differs from the previous one by locating a Self-Controlling Assembly 14 (designed as a movable lever), which extends to the area of sliding span of a Derailleur 11.1. The Self-Controlling Assembly 14 is attached to a Controlling Mechanism 8.1 of a Regulating Assembly 8 with Locking Mechanism 8.2 (designed as a plug-in element) slidable between a Linkage Arrangement 4.2 and a Tail 2. The embodiment of the bicycle depicted on FIG. 10f works as follows: A Suspension Assembly 4 is regulated by a Self-Controlling Assembly 14 that reacts to a Regulating Assembly 8. The advantage of this solution is in automatic locking of suspension or decreasing its softness, when the Drivetrain Assembly 11 is using the speed gears typical for climbing or when the pedaling power is increasing.

Figure 10G:
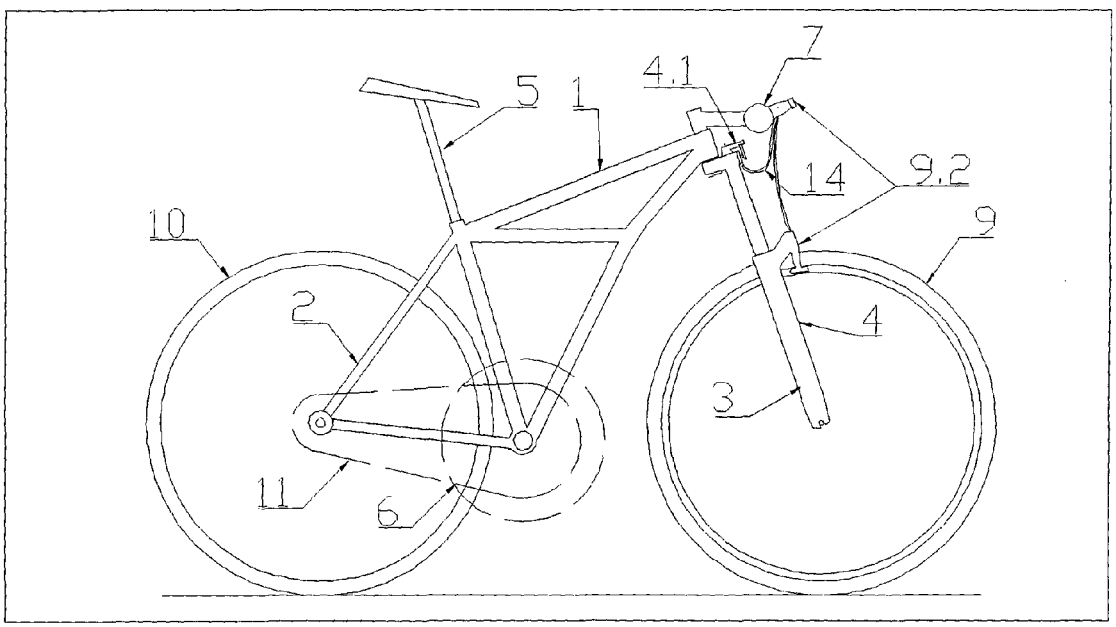
Figure 10H:
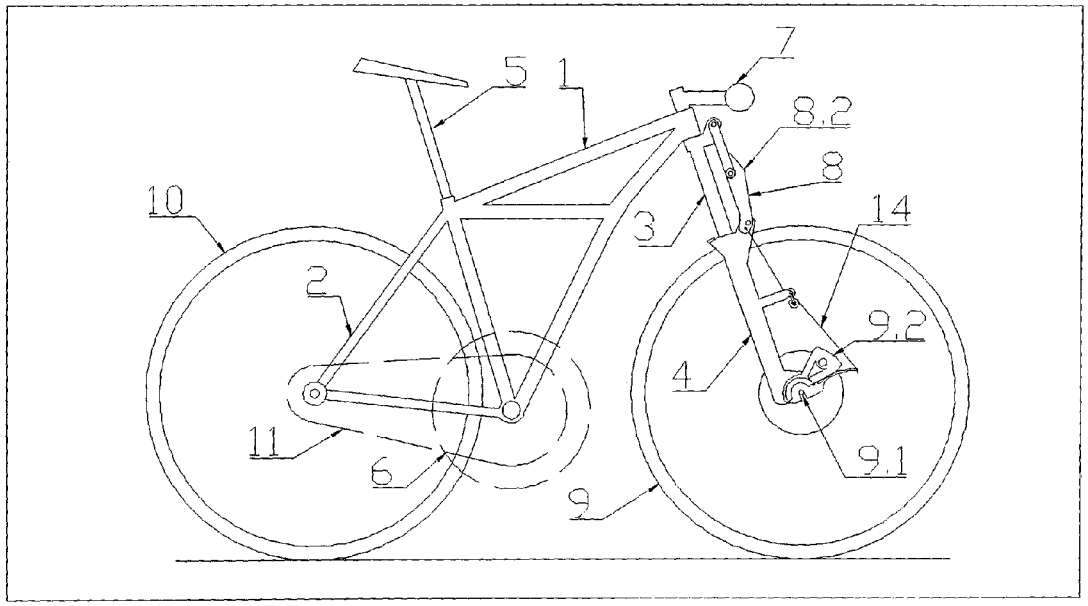
Figure 10I:
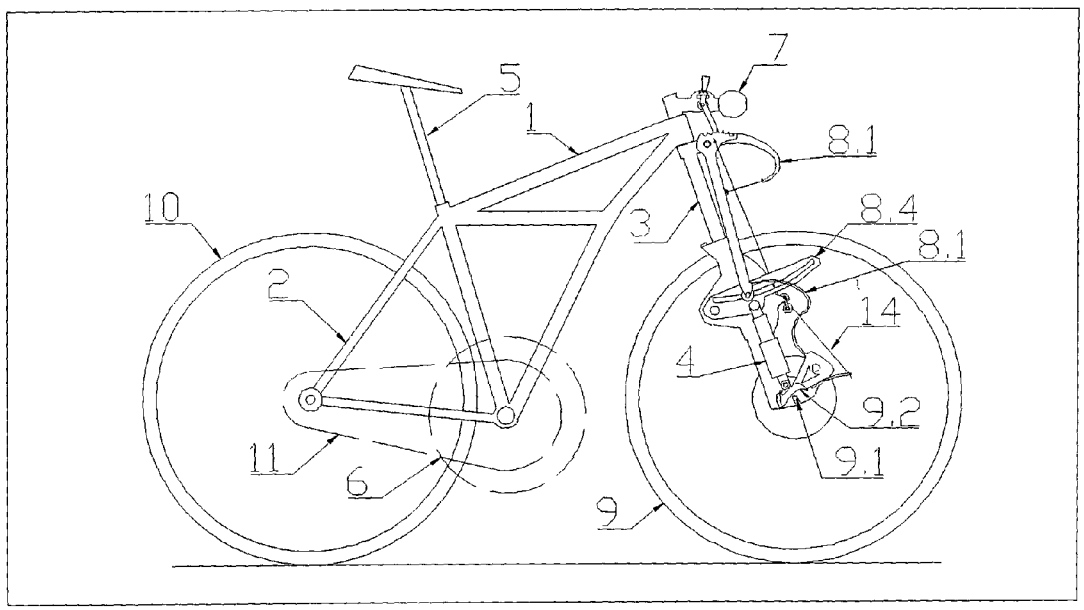

FIGS. 10g to 10i present such embodiments of a Self-Controlling Assembly 14 where it is controlled by activation of a Front Brake 9.2.

FIG. 10g presents an embodiment of a Self-Controlling Assembly 14, attached to some of the movable parts of a Front Brake 9.2 (for example to brake-shoes, a reversing element, a wire strand, a brake lever or, in case of a hydraulic Front Brake 9.2, to its hydraulic system). The depicted bicycle, with a front suspension, has a rim Front Brake 9.2. The Self-Controlling Assembly 14 (designed as a wire strand and a reversing element) is attached to a Regulating Unit 4.1 of a front Suspension Assembly 4 and to a movable part of a Front Brake 9.2 (to a brake control lever).

FIGS. 10h to 10i present embodiments of a Self-Controlling Assembly 14 attached to a slidable Front Brake 9.2.

The bicycle, with a front suspension, depicted in FIG. 10h has a disc Front Brake 9.2 attached to a Fork 3 slidably along an arc about the Front Axle 9.1. A Self-Controlling Assembly 14 (designed as a wire strand and a reversing element) is attached to a Fork 3. The Self-Controlling Assembly 14 forces (by its reversing element) the Front Brake 9.2 to keep it in its rear position. The Self-Controlling Assembly 14 is attached (by means of its wire strand) to that end of a Locking Mechanism 8.2 (designed as a breaking strut) towards which the connecting point is shifted when a Fork 3 is expanding.

The bicycle depicted in FIG. 10i has an Adjusting Mechanism 8.4. A Self-Controlling Assembly 14 is attached (by its wire strand) to a movable part of the Adjusting Mechanism 8.4 so that its acting is pointed against the direction of acting Controlling Mechanism 8.1 (its reversing element). The second Controlling Mechanism 8.1 is connected also to the Adjusting Mechanism 8.4 (to its lock) and to some movable part of the Front Brake 9.2 (here, to brake-shoes).

The embodiment of the bicycle depicted on FIG. 10i works as follows: A Self-Controlling Assembly 14 automatically transfers motion of movable parts of the Brake to a Regulating Unit 4.1 or to a Regulating Assembly 8, whereby the front shock absorber is locked or its softness is decreased, temporarily for the period of braking. The advantage of this solution is in automatic limiting of undesirable lowering of a Handlebar Assembly 7 caused by shortening of the front Suspension Assembly 4 due to inertia while braking. This solution enhances safety against forward flip, especially in steep downhill riding.

Figure 10J:
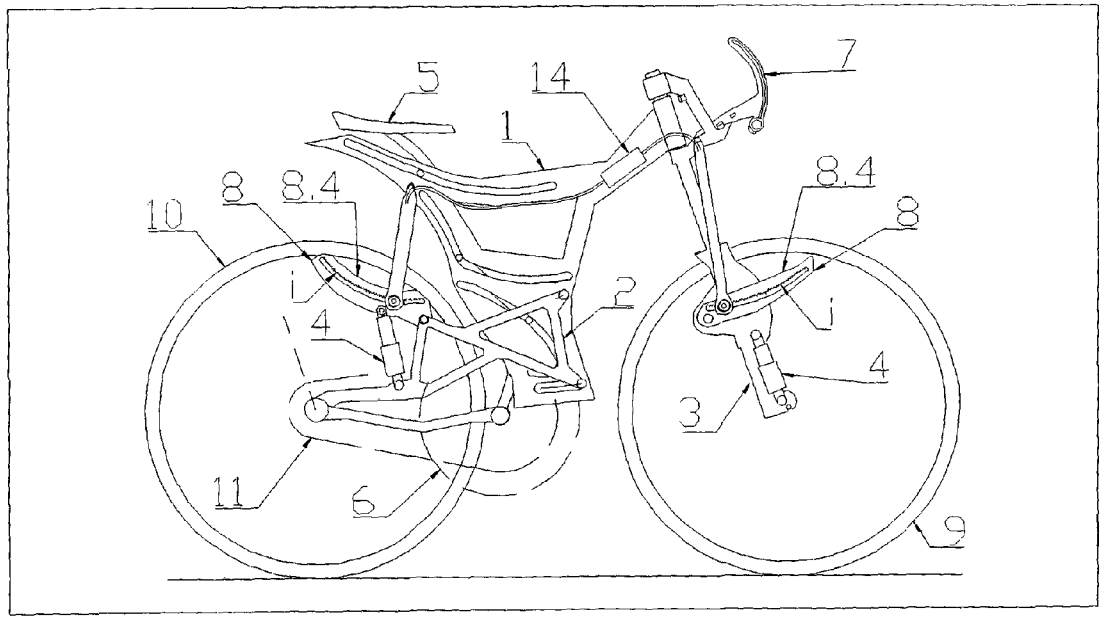

FIG. 10j presents an embodiment of a Self-Controlling Assembly 14, driven by an external source of power (for example, electric motor hydraulic pump) using its control (manual switch, or automatic switch equipped with suitable sensors, monitoring e.g. slope, vibrations, elevations of suspension, forces of pedalling, activations of brake). The depicted suspended bicycle has its front and rear Regulating Assemblies 8 with Adjusting Mechanisms 8.4 (each of them is designed as a pair of coupled Swing Bars, the connecting pin of which is located on a carriage, movable along the cogged path i), which are slidable and then lockable against motion by their own gadgets (each of them is designed as a driving gearwheel located on a carriage with sprockets fitting into cogged path i) and are attached to hydraulic Self-Controlling Assemblies 14 (designed as hydraulic pumps, pressure hoses, hydraulic cylinders and mechanical gearing equipments for transferring motion from cylinders to sprockets), which in some cases may share some components (especially hydraulic pump) with each other or with other hydraulic systems of the bicycle (for example with a hydraulic Shifting Assembly of a Rider-Positioning System, as of FIG. 8d).

The embodiments of the bicycle depicted on FIG. 10j works as follows: A Self-Controlling Assembly 14 automatically adjusts Regulating Assemblies 8 to adapt softness of suspension of the bicycle to its speed, to ground roughness and to slope. Used sensors, algorithms and sources of power may be shared by automatic setting of the Rider-Positioning System (non depicted in FIG. 10j). The advantage of this automation is in high comfort.

Example 11

The bicycle depicted on FIGS. 11a to 11d comprises a Motion System (a Front Wheel 9, Rear Wheel 10, Drivetrain Assembly 11) and a Suspension System (Suspension Assemblies 4), which are equal as those in Example 1 or 6 and a Regulating System (Regulating Assemblies 8), which is equal as that in Example 4 or 5. The bicycle has a Rider-Positioning System (a Seat Assembly 5, Pedal Assembly 6, Handlebar Assembly 7), assemblies of which are equal as those in Example 1 or 2 or 3 or 7 and a Transforming System (a Synchronizing Assemblies 13, self-controlling assemblies 14 and in some cases Shifting Assemblies 12) equal as those in Example 8, 9 and 10.

The bicycle is featured with a shape-modifiable Frame System (a Frame 1, Tail 2, Fork 1) which has a shape-modifiable Frame 1 (its part with a Head Tube 1.1 is movably attached to the rest of a Frame 1) and/or has a shape-modifiable Tail 2 and/or its Frame 1 and Tail 2 are interconnected by a Suspension Assembly 4, which has one of its joints slidably attached. The movable parts of the shape-modifiable Frame System and/or shape-modifiable Rider-Positioning System are attached to Shifting Assembly 12 or Synchronization Assembly 13 of the Transformation System.

Figure 11A:
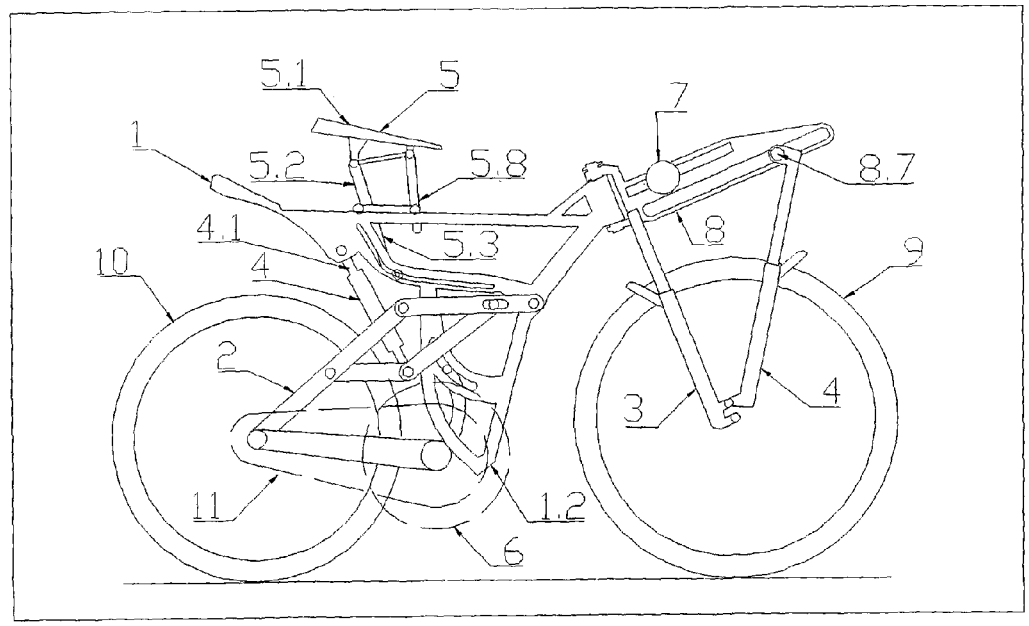
FIGS. 11a to 11c show bicycles with their Transforming Systems, containing Synchronizing Assemblies, which connect movable assemblies of Rider-Positioning System with shape-modifiable Tails.
Figure 11B:
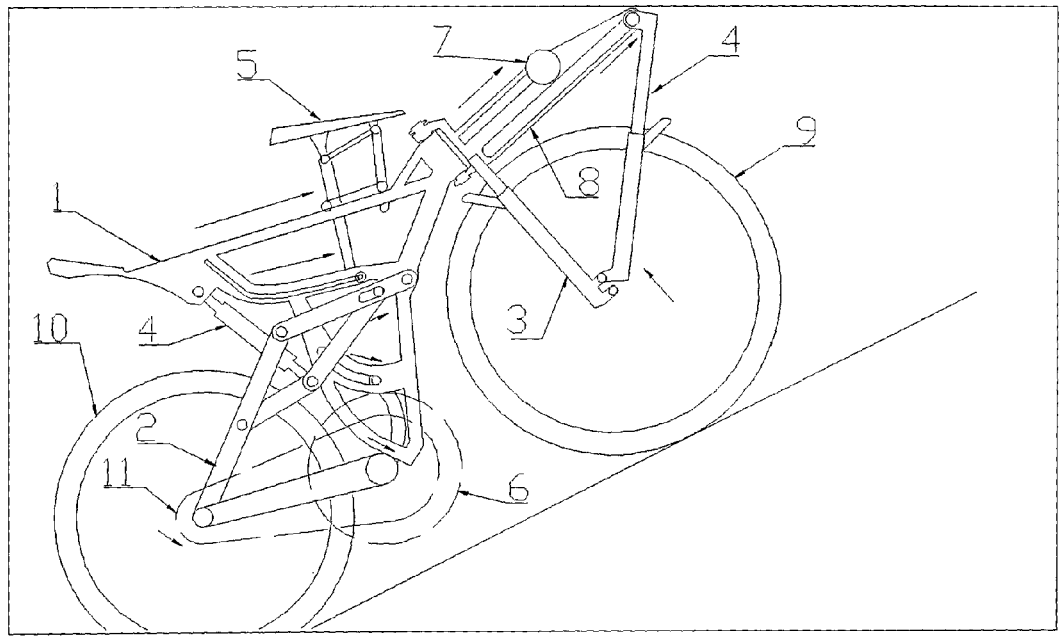
Figure 11C:
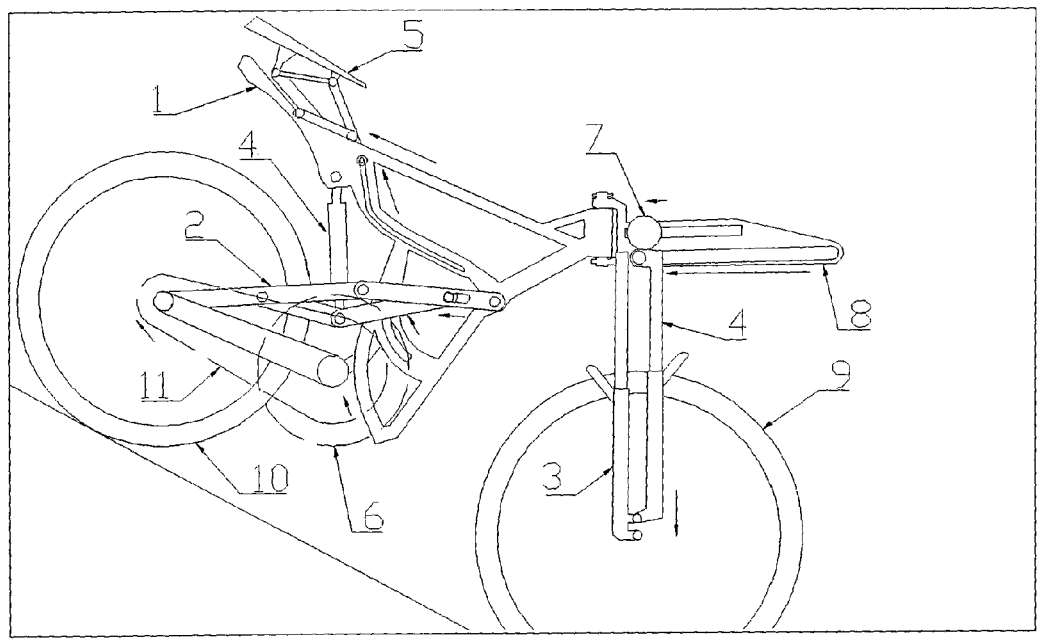

FIGS. 11a to 11c depict three different shape versions of the same bicycle, equipped with a shape-modifiable Tail 2.

The bicycle has a large-diameter Front Wheel 9 on a telescopic Fork 3 with an external Suspension Assembly 4, attached to a Regulating Assembly 8 with a Reducible Joint 8.7 (equal as the bicycle in FIG. 5f). The bicycle has a slidable Pedal Assembly 6, which is, alike a Tail 2, attached to a Frame 1 and supported by means of a Lateral Support 1.2 (designed equally as that in the FIG. 1c). A Tail 2 has variable geometry (due to its breaking-strut-type design with a slidable spacing mechanism and a shift preventing lock) and is pivotally attached to the upper part of a Frame 1.

The Tail 2 and Frame 1 are braced by means of a Suspension Assembly 4 with a Regulating Unit 4.1.

A slidable Seat Assembly 5 has a Seat Carrier 5.3 which is slidably attached to a Frame 1 (to a relevantly shaped slot in a Frame 1 and to an upper tube) and which bears a Seat Post 5.2 to which a Seat 5.1 is pivotally connected. A Seat 5.1 has another connection to a Frame 1 provided by an Inclinating Unit 5.8. A Synchronizing Assembly 13 (not depicted in FIGS. 11a-c) interconnects mutually a Seat Carrier 5.3 with slidable parts of a Tail 2, Pedal Assembly 6 and in some cases also a Handlebar Assembly 7. The input parts of Self-Controlling Assemblies 14 (not depicted in FIGS. 11*a-c*) can be connected to a Synchronizing Assembly 13 or to the parts of a bicycle, which are slid to it and the output parts of them are connected to a Regulating Unit 4.1 of a rear Suspension Assembly 4 and to a Reducible Joint 8.7 of a front Regulating Assembly 8.

The bicycle depicted in FIG. 11*a* is adjusted for ride in non sloped ground and has a standard geometry of current mountain bicycles. It has usual inclination, length and elevation of a Fork 3, usual trail (the distance between the cross-point of a Fork 3 axle in the ground plane and the contact point of a Front Wheel 9), usual Wheel Base (the distance between a Front Wheel 9 and a Rear Wheel 10) and usual inclination of the flow-line between a Seat 5.1 and a Bottom Bracket 6.1. A Regulating Unit 4.1 of a rear Suspension Assembly 4 is partly open.

The bicycle depicted in FIG. 11*b* is adjusted for downhill ride and has "chopper" type geometry. A Fork 3 is extended, due to rear position of a Regulating Assembly 8 and has larger inclination, trail, and elevation.

A wheelbase is increased due to elongated state of a shape-modifiable Tail 2. A Regulating Unit 4.1 of a rear Suspension Assembly 4 is completely open. Due to connection to a Synchronizing Assembly 13 (not depicted in FIG. 11*a*), a Bottom Bracket 6.1 is lifted with respect to ground surface and a Seat 5.1 is shifted backwardly and above the area of Rear Wheel 10 elevation, what increases also the inclination of the flow-line between a Seat 5.1 and a Bottom Bracket 6.1.

The bicycle depicted in FIG. 11*c* is adjusted for uphill ride and has shortened geometry. A Fork 3 is shortened, due to front position of a Regulating Assembly 8 and has lesser inclination, very small trail, and no elevation. A wheelbase is reduced due to shortened state of a shape-modifiable Tail 2. A Regulating Unit 4.1 of a rear Suspension Assembly 4 is completely open. A Bottom Bracket 6.1 is lowered with respect to ground surface and a Seat 5.1 is shifted forwardly, what reduces inclination of the flow-line between a Seat 5.1 and a Bottom Bracket 6.1. The bicycle works equally as those with the same assemblies described in previous examples. The advantage is that a trail, a fork inclination and a wheelbase can be changed by changing geometry of a Fork 3 and by reshaping of a Tail 2. Mentioned changes then result also in change of rider's gravity centre, what optimizes bicycle stability for given slope of ride.

Figure 11D:
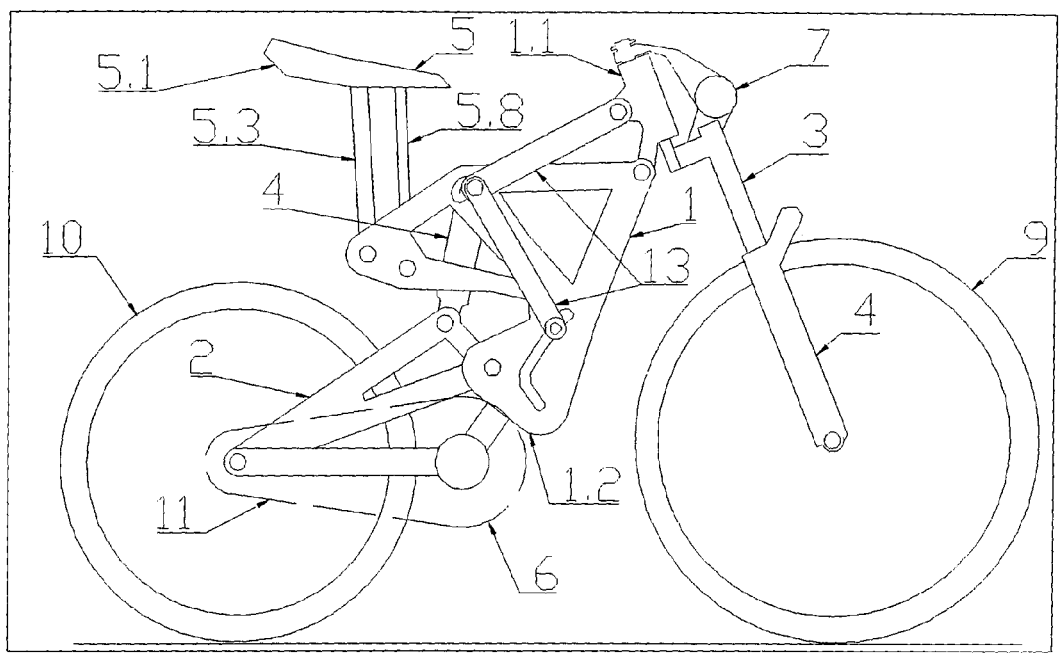
FIG. 11d shows a bicycle with a Transforming System comprising Synchronizing Assemblies, which interconnects movable assemblies of a Rider-Positioning System with a shape-modifiable Frame mutually.

In FIG. 11*d* is depicted a bicycle with a shape-modifiable Frame 1 and with equal range of modifiability of geometry as that in Examples 11a to 11c. The bicycle has a slidable Pedal Assembly 6, which is attached to a Frame 1 and supported by means of Lateral Support 1.2 (designed equally as that in FIG. 1*c*). A Seat Assembly 5 has a Seat 5.1 pivotally attached to a Seat Carrier 5.3 and to an Inclinating Unit 5.8. A Tail 2, a Seat Carrier 5.6 and an Inclinating Unit 5.8 are pivotally attached to a Frame 1. A Head Tube 1.1 of a shape-modifiable Frame 1 is in its bottom end pivotally connected with the rest of a Frame 1 and in its upper end attached to a Synchronizing Assembly 13. The Synchronizing Assembly 13 (designed as a breaking strut with a central pin slidable along a slot on a Frame 1) connects a Frame 1 with a Head Tube 1.1 and with a Support Unit 6.2 of a slidable Pedal Assembly 6, by its ends and with a Suspension Assembly 4, by its centre. The bicycle works equally as those with the same assemblies described in previous examples. The advantage of this solution is that a Trail, a Fork inclination and a wheelbase can be changed by reshaping Frame 1 and by readjusting other movable assemblies via Synchronizing Assembly 13. Mentioned changes then result also in change of rider's gravity centre, what optimizes bicycle stability for given slope of ride.

INDUSTRIAL APPLICABILITY

The bicycle designed according to the invention can be produced in various versions optimized for different purposes, beginning from practical transport on strengthened roads in mountain regions, through road sport cycling and cyclo-tourism on forest paths up to extreme and adrenaline sport activities on special or shaggy untreated routes. Sport versions of the bicycle creates a wide field for birth of new kinds of sport contests both in natural surroundings and on artificially built extreme routes. Relate sport-entertaining industry may also accrue.

The rendered invention is suitable also for the bodies of electro bicycles used for re-creative cyclo-tourism, because of their ability to modify their geometry and suspension for steep uphill and for very rugged grounds as well. Some elements of the invention can be used in off-road motorcycles design or man-powered double or more track vehicles.

LIST OF REFERENCE SIGNS

1—Frame
1.1—Head Tube
1.2—Lateral Support
1.3—Bottom Support
2—Tail
2.1—Sliding Pin
2.2—Connecting Unit
3—Fork
4—Suspension Assembly
4.1—Regulating Unit
4.2—Linkage Arrangement
5—Seat Assembly
5.1—Seat
5.2—Seat Post
5.3—Seat Carrier
5.4—Top Connector
5.5—Bottom Connector
5.6—Seat Lock
5.7—Swing Bar
5.8—Inclinating Unit
6—Pedal Assembly
6.1—Bottom Bracket
6.2—Hanger Unit
6.3—Distancing Unit
6.4—Pedal Lock
6.5—Sliding Unit
7—Handlebar Assembly
7.1—Handlebar
7.2—Handlebar Carrier
7.3—Handlebar Lock
7.4—Handlebar Carrier Lock
8—Regulating Assembly
8.1—Controlling Mechanism
8.2—Blocking Mechanism
8.3—Limiting Mechanism
8.4—Adjusting Mechanism
8.5—Straining Unit
8.6—Extensible Joint
8.7—Reducible Joint
9—Front Wheel
9.1—Front Axle
9.2—Front Brake
10—Rear Wheel 10.1—Rear Axle
10.2—Rear Brake
11—Drivetrain Assembly
11.1—Derailleur
12—Shifting Assembly
13—Synchronizing Assembly
14—Self-Controlling Assembly

The invention claimed is:

1. A bicycle comprising a Frame (1), a Front Wheel (9), a Rear Wheel (10), a Drivetrain Assembly (11), a Pedal Assembly (6), a Seat Assembly (5), Handlebar Assembly (7), a hard Tail (2) or a movable Tail (2), which is supported by a Suspension Assembly (4) and a hard Fork (3) or a telescopic Fork (3), the mutually slidable parts of which are interconnected by a Suspension Assembly (4), wherein a center of the Front Wheel (9), a center of the Rear Wheel (10), a Bottom Bracket (6.1) center, a Seat (5.1) connection and a Handlebar (7.1) connection form the vertices of a pentagon, the shape of which is slope-modifiable by at least one positionally adjustable vertex, when Suspension Assemblies (4) are unloaded, wherein the position of the Bottom Bracket (6.1) center is adjustable by means of the Pedal Assembly (6), which has one connection movably attached to the rear side of the Tail (2) or to the Rear Wheel Axle (10.1) of the Rear Wheel (10) by means of a Spacing Unit (6.3) and the other connection rotatably and slidably attached to the Frame (1) or to the Seat Assembly (5) or to the front side of the Tail (2) by means of a Support Unit (6.2), wherein this connection is lockable against sliding by a Bottom Bracket Lock (6.4);

the position of the Seat (5.1) connection is adjustable by means of the Seat Assembly (5), having a Seat Carrier (5.3) movably attached to the Frame (1) by two slidable Connections (5.4) and (5.5) and is lockable by a Seat Lock (5.6), wherein the Pedal Assembly (6) is movably attached to the Frame (1), by a hard connection of the Bottom Bracket (6.1) to the movable Tail (2), or by connection of the Bottom Bracket (6.1) concurrently with two movable connections, where the first of them is provided by means of the Distancing Unit (6.3) to the rear end of the Tail (2) or to the Rear Wheel Axle (10.1) and the second one by means of the Support Unit (6.2) to the Frame (1) or to the Seat Assembly (5);

the position of the Handlebar (7.1) connection is adjustable by means of the Handlebar Assembly (7), having the Handlebar (7.1) attached movably with respect to the Fork (3) by means of the Handlebar Carrier (7.2) and lockable by a Handlebar Lock (7.3) and/or a Handlebar Carrier Lock (7.4);

the position of the Rear Wheel (10) center is adjustable by means of the Tail (2), which is movably connected to the Frame (1), wherein there is also other connection of the Tail (2) to the Frame (1) by the Suspension Assembly (4) and a Regulating Assembly (8), containing an Extensible Joint (8.6), wherein the position of the Tail (2) with respect to the Frame (1) is adjustable and lockable by the Regulating Assembly (8), when the Suspension Assembly (4) is unloaded;

the position of the Front Wheel (9) center is adjustable by means of the telescopic Fork (3), the mutually slidable parts of which are interconnected by the Suspension Assembly (4) and by the Regulating Assembly (8), containing a Reducible Joint (8.7), wherein the mutual position of the slidable parts of the telescopic Fork (3) is adjustable and lockable by the Regulating Assembly (8) when the Suspension Assembly (4) is unloaded.

2. A bicycle according to claim 1, wherein the Suspension Assembly (4) and the Regulating Assembly (8), which are mutually independent, or the Suspension Assembly (4) and the Regulating Assembly (8), which are in series arrangement, or the Suspension Assembly (4) supplemented with a Self-Controlling Assembly (14) interconnect mutually slidable parts of the telescopic Fork (3) and/or the Tail (2) and the Frame (1), which are movably connected with each other.

3. A bicycle according to claim 1, wherein said movably attached Tail (2) and/or said movably attached Support Unit (6.2) are propped against the Frame (1) by at least one Lateral Support (1.2) and/or Bottom Support (1.3).

4. A bicycle according to claim 1, wherein the Tail (2) is movably attached to the Frame (1) by at least two Sliding Pins (2.1), which are slidable along the paths (d).

5. A bicycle according to claim 1, wherein the arrangement of the Seat Assembly (5) is embodied outside the room of the Rear Wheel (10) suspension travel and is provided with an arch-shaped Seat Post (5.2) inserted to the equally shaped Seat Carrier (5.3) of the Seat Assembly (5) or with a pair of Seat Posts (5.2) inserted to a pair of Seat Carriers (5.3) of the Seat Assembly (5), which are situated on both sides of Frame (1).

6. A bicycle according to claim 1, wherein the Handlebar Assembly (7) is connected to the Fork (3) both above and below a Head Tube (1.1).

7. A bicycle according to claim 1, wherein the Regulating Assembly (8) comprises a Locking Mechanism (8.2) or a Limiting Mechanism (8.3) or an Adjusting Mechanism (8.4), which interconnects either the Frame (1) with the Tail (2) or the mutually slidable parts of the telescopic Fork (3) and the said interconnection is embodied either as a co-assembly with the Suspension Assembly (4) or separately from it.

8. A bicycle according to claim 7, wherein the Regulating Assembly (8) comprises either an Extending Joint (8.6) or a Reducing Joint (8.7) connected either to a Straining Unit (8.5) or to a Controlling Mechanism (8.1) and where the said Extending Joint (8.6) or the Reducing Joint (8.7) form a co-assembly with the Suspension Assembly (4) interconnecting the Frame (1) with the Tail (2) or mutually slidable parts of the telescopic Fork (3) together on the range of an adjustable length.

9. A bicycle according to claim 1, wherein the bicycle comprises at least one of shape-modifiable assemblies, i.e. the Seat Assembly (5), the Pedal Assembly (6), the Handlebar Assembly (7), the Regulating Assembly (8), containing the Extensible Joint (8.6) or the Reducible Joint (8.7), wherein at least one of them is attached to a Shifting Assembly (12) and/or a Synchronizing Assembly (13), which has also other connection either to the other one of these assemblies or to the reshapable Tail (2) or to the reshapable Frame (1).

10. A bicycle according to claim 1, wherein the Self-Controlling Assembly 14 is attached to the Controlling Mechanism (8.1) of the Regulating Assembly (8) and/or to a Regulating Unit (4.1) of the regulatable Suspension Assembly (4).

* * * * *